United States Patent [19]
Nozawa et al.

[11] Patent Number: 6,032,652
[45] Date of Patent: Mar. 7, 2000

[54] FUEL INJECTION SYSTEM HAVING VARIABLE FUEL ATOMIZATION CONTROL

[75] Inventors: Masaei Nozawa, Okazaki; Sigenori Isomura, Kariya, both of Japan

[73] Assignee: Denso Corporation, Kariya, Japan

[21] Appl. No.: 09/199,783

[22] Filed: Nov. 25, 1998

[30] Foreign Application Priority Data

Nov. 27, 1997 [JP] Japan ................................. 9-326422
Nov. 27, 1997 [JP] Japan ................................. 9-326424

[51] Int. Cl.$^7$ ........................... F02M 69/00; F02D 41/32
[52] U.S. Cl. .......................................................... 123/478
[58] Field of Search ................................. 123/478, 480, 123/472, 481, 531, 533

[56] References Cited

U.S. PATENT DOCUMENTS

| | | | |
|---|---|---|---|
| 5,027,778 | 7/1991 | Nogi ........................................ | 123/472 |
| 5,220,899 | 6/1993 | Ikebe et al. ............................. | 123/531 |
| 5,495,839 | 3/1996 | Samejima et al. ...................... | 123/480 |
| 5,666,920 | 9/1997 | Ito et al. ................................. | 123/432 |

FOREIGN PATENT DOCUMENTS

| | | |
|---|---|---|
| 53-131322 | 11/1978 | Japan . |
| 61-268842 | 11/1986 | Japan . |
| 2-102365 | 4/1990 | Japan . |
| 8-177689 | 7/1996 | Japan . |

*Primary Examiner*—Willis R. Wolfe
*Assistant Examiner*—Hieu T. Vo
*Attorney, Agent, or Firm*—Nixon & Vanderhye P.C.

[57] ABSTRACT

An air-assisted type injector injects a fuel into an intake port toward the face part of an intake valve, and its injection port has multiple holes to atomize the injected fuel into a predetermined fuel particle diameter (e.g., SMD=about 50 microns). An air feed pump supplies pressurized air to the injector to atomize the gas particle size of about 10 microns in a low/medium speed and low/medium load region where the face of the intake valve is at low temperatures. In a high speed or high load region where the face temperature is high, the air assistance by the air feed pump is stopped. When the fuel atomization by the air assistance is stopped, the gas particle diameter of the injected fuel is about 50 microns, but the fuel atomization is promoted by the valve face at a high temperature. Thus, the fuel flowing into the cylinder is atomized to a diameter as small as that at the time when the air assistance is executed.

15 Claims, 25 Drawing Sheets

SMD = 10μm LEVEL

SMD = 50μm LEVEL

FUEL INJECTION SYSTEM HAVING VARIABLE FUEL ATOMIZATION CONTROL

CROSS REFERENCE TO RELATED APPLICATION

This application relates to and incorporates herein by reference Japanese Patent Applications No. 9-326422 and No. 9-326424, both being filed on Nov. 27, 1997.

BACKGROUND OF THE INVENTION

1. Field of the Invention

The present invention relates to a fuel injection system for an internal combustion engine for automobiles, for example. More particularly, the present invention relates to a fuel injection system for an internal combustion engine, which is equipped with fuel atomizing device such as an air feed pump or a multi-port injector for atomizing the fuel, as injected by an injector, by using a part of the output of the engine.

2. Related Art

For the reduction of the unburned HC in exhaust gases and stabilizing the combustion, there have been hitherto embodied a variety of techniques for atomizing the fuel injected by a fuel injector. There is a technique in which a difference in the pressure between the upstream and downstream sides of a throttle valve is utilized to bring intake air due to the differential pressure into impingement against the fuel injected from the injection port of the injector thereby to atomize the fuel. This technique is generally known as the differential pressure type air-assisted type injector. This injector establishes a mean gas particle size of about 80 to 100 microns.

In recent years, however, there has been a demand for reducing the gas particle diameter to a smaller size. In order to satisfy this demand, there has been proposed a technique in which an air feed pump is driven by a driving source such as the motor output of a battery or the output of a crankshaft to atomize the fuel with the pressurized air fed from the pump. According to this air-assisted type injector, it is possible to provide a fuel gas particle diameter of about several tens microns.

In the air-assisted type injector using the air feed pump, however, the electric power of the battery is consumed by the motor drive, for example, causing a problem that the battery voltage unexpectedly drops. In this case, the power generation load on the internal combustion engine increases to require a battery of large capacity for avoiding the problem. When the crankshaft output is employed as the drive source, on the other hand, the engine output is partially consumed for the air-assisted type so that the energy loss occurs, causing an unexpected output drop. In this case, the load on the internal combustion engine rises and lessens fuel economy.

When there is used the conventional injector which is equipped with an injection port having multiple holes, on the other hand, the atomization of the fuel spray is achieved by thinning each of the stream lines which are injected from the individual ports of the injection port. If these thinned stream lines interfere, however, the fuel particles will again grow larger. With the grown large particle diameter of this case, the effect to atomize the fuel spray drops. In order to avoid this grow of the fuel particles, therefore, it is necessary to widen the spray angle of the injector. With this enlarged spray angle, however, the fuel spray is liable to impinge to wet intake port wall parts, thereby causing a problem that the port wetting amount increases.

SUMMARY OF THE INVENTION

The present invention has an object to provide a fuel injection system for an internal combustion engine, which can save the energy at an engine running time while executing a satisfactory atomization of a fuel.

The present invention has another object to provide a fuel injection system for an internal combustion engine, which can reduce the port wetting with the fuel spray while preventing the atomized fuel from growing larger.

According to the present invention, an air-assisted type fuel injector having an injection port with multiple holes is used to inject fuel into an intake port toward the face part of an intake valve, so that the injected fuel is atomized into small fuel particles of about 50 microns. An air feed pump supplies pressurized air to the injector to atomize the gas particle size of about 10 microns in a low/medium speed and low/medium load region where the face of the intake valve is at low temperatures. In a high speed or high load region where the face temperature is high, the air assistance by the air feed pump is stopped, because the fuel atomization is promoted by the valve face at a high temperature.

Preferably, the atomization is adjusted variably with an estimated temperature of the face of the intake valve, and the atomization is reduced as the estimated temperature rises.

Preferably, the fuel injector is driven to enable the injected fuel to flow into a cylinder within an initial period of opening of the intake valve.

Alternatively, according to the present invention, a fuel injector having an injection port is constructed to have a fuel spray angle determined based on the position of the injection port and the diameter of the face of an intake valve. When the injector port is located at the central part of an intake port, the spray angle is set within a range from 8° to 15°. When the injection port is located close to the intake valve, the spray angel is set within a range from 20° to 30°.

BRIEF DESCRIPTION OF THE DRAWINGS

Other objects, features and advantages of the present invention will become more apparent from the following detailed description made with reference to the accompanying drawings. In the accompanying drawings:

FIGS. 12A to 12D are time charts showing a batch injection operation and a split injection operation;

DETAILED DESCRIPTION OF THE PREFERRED EMBODIMENTS

Here, throughout the specification, "part of the output of the internal combustion engine" generally means the entirety of the energy system of a vehicle entering the internal combustion engine, and specifically corresponds, as the use of the part of the engine output, to the use of the crankshaft output of the engine and the output of the motor to be activated by a battery power source.

First Embodiment

A system according to the first embodiment optimizes a fuel injection rate of a gasoline injection type internal combustion engine. An injector for injecting and feeding fuel to each cylinder is controlled by an electronic control unit (ECU) composed mainly of a microcomputer. In this embodiment, an air-assisted type injector is employed to atomize the fuel, and an air feed pump is driven for the fuel atomization by using the part of the output of the internal combustion engine.

Figure 1:
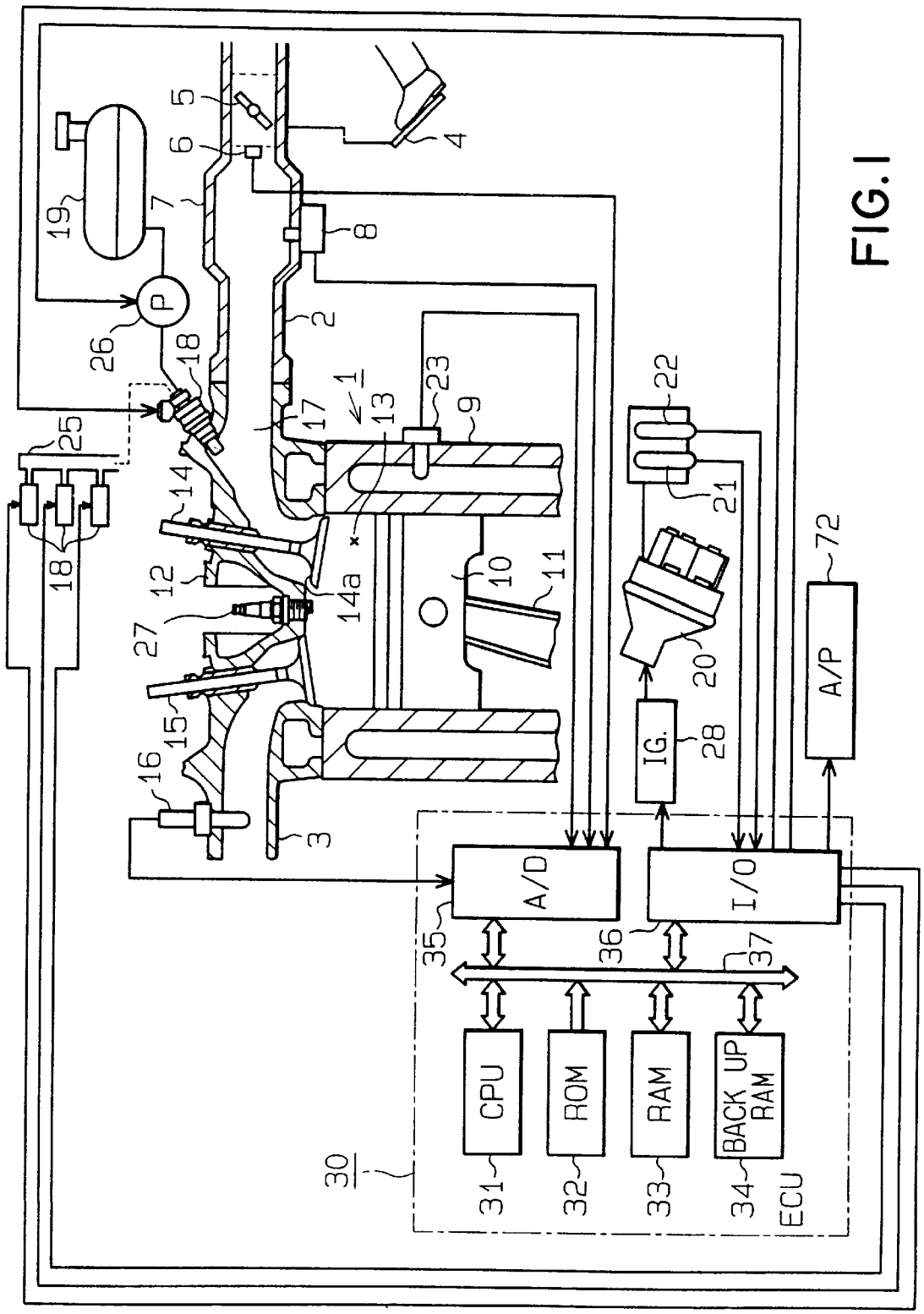
FIG. 1 is a schematic view showing a fuel injection system according to a first embodiment of the present invention.

Referring to FIG. 1, the internal combustion engine is exemplified by a four-cylinder 4-cycle engine (engine) 1. To this engine 1, there are connected an intake pipe 2 and an exhaust pipe 3. The intake pipe 2 is equipped with a throttle valve 5 associated with an accelerator pedal 4, and the degree of opening of the throttle valve 5 is detected by a throttle opening sensor 6. In a surge tank 7 of the intake pipe 2, on the other hand, there is arranged an intake pressure sensor 8.

In a cylinder 9 of the engine 1, there is fitted a piston 10 which reciprocates upward and downward. The piston 10 is connected through a connection rod 11 to the crankshaft (not shown). Over the piston 10, there is formed a combustion chamber 13 which is defined by the cylinder 9 and a cylinder head 12. This combustion chamber 13 has communications with the intake pipe 2 and the exhaust pipe 3 through an intake valve 14 and an exhaust valve 15.

The exhaust pipe 3 is equipped with an air-fuel ratio (A/F) sensor 16 of a limiting current type for outputting a wide range and linear air-fuel signal in proportion to the oxygen concentration in the exhaust gases or the concentration of carbon monoxide in the unburned gases. On the cylinder 9 or water jacket, on the other hand, there is arranged a water temperature sensor 23 for detecting the temperature of the cooling water.

An intake port 17 of the engine 1 is equipped with a solenoid drive type fuel injector 18 which is fed with fuel (gasoline) from a fuel tank 19. In this embodiment, there is constructed a multi-point injection (MPI) system which has one injector 18 for each branch of the intake manifold. The injectors 18 of the individual cylinders are connected by a delivery pipe 25. Here, this embodiment adopts the injector 18 of the multiple-hole air-assisted type. Between the fuel tank 19 and the injector 18, there is arranged a fuel pump 26 for feeding the fuel while adjusting its pressure (i.e., fuel pressure) to the delivery pipe 25.

There is arranged in the cylinder head 12 an ignition plug 27 which is ignited with an igniting high voltage from an igniter 28. With this igniter 28, there is connected a distributor 20 for distributing the igniting high voltage to the ignition plugs 27 of the individual cylinders. In the distributor 20, there are arranged a reference position sensor 21 for outputting a pulse signal at every 720 degrees CA (crank angle) in response to the rotational state of the crankshaft, and a rotation angle sensor 22 for outputting a pulse signal at every crank angles (e.g., every 30 degrees CA).

In this case, the fresh air, as fed from the upstream of the intake pipe 2, and the injected fuel, as injected by the injector 18, are mixed in the intake port 17 so that the mixture flows into the combustion chamber 13 in accordance with the opening operation of the intake valve 14. Then, the mixture, as having flown into the combustion chamber 13, is combusted with the ignition spark of the ignition plug 27.

An ECU 30 is constructed by a microcomputer system including a CPU 31, a ROM 32, a RAM 33, a backup RAM 34, an A/D converter 35, and an input/output interface (I/O) 36. The individual detection signals of the throttle opening sensor 6, the intake pressure sensor 8, the A/F sensor 16 and the water temperature sensor 23 are inputted to the A/D converter 35, in which they are subjected to the A/D conversions and are then fetched by the CPU 31 through a bus 37. Moreover, the pulse signals of the reference position sensor 21 and the rotation angle sensor 22 are fetched by the CPU 31 through the input/output interface 36 and the bus 37.

On the basis of the detection signals of the foregoing individual sensors, the CPU 31 detects the engine running state such as the throttle opening TH, the intake pressure PM, the air-fuel ratio (A/F), the cooling water temperature Tw, the reference crank position (G signal) and the engine speed (Ne). On the basis of these engine running states, moreover, the CPU 31 calculates the fuel injection rate (amount), the ignition timing and so on and outputs control signals to the injector 18 and the igniter 28. Especially upon the injector control, the fuel is injected for a calculated time period for the engine 1 to shift from the exhaust stroke to the suction stroke so that the injected fuel flows into the combustion chamber 13 as the intake valve 14 opens in the suction stroke.

Figure 2:
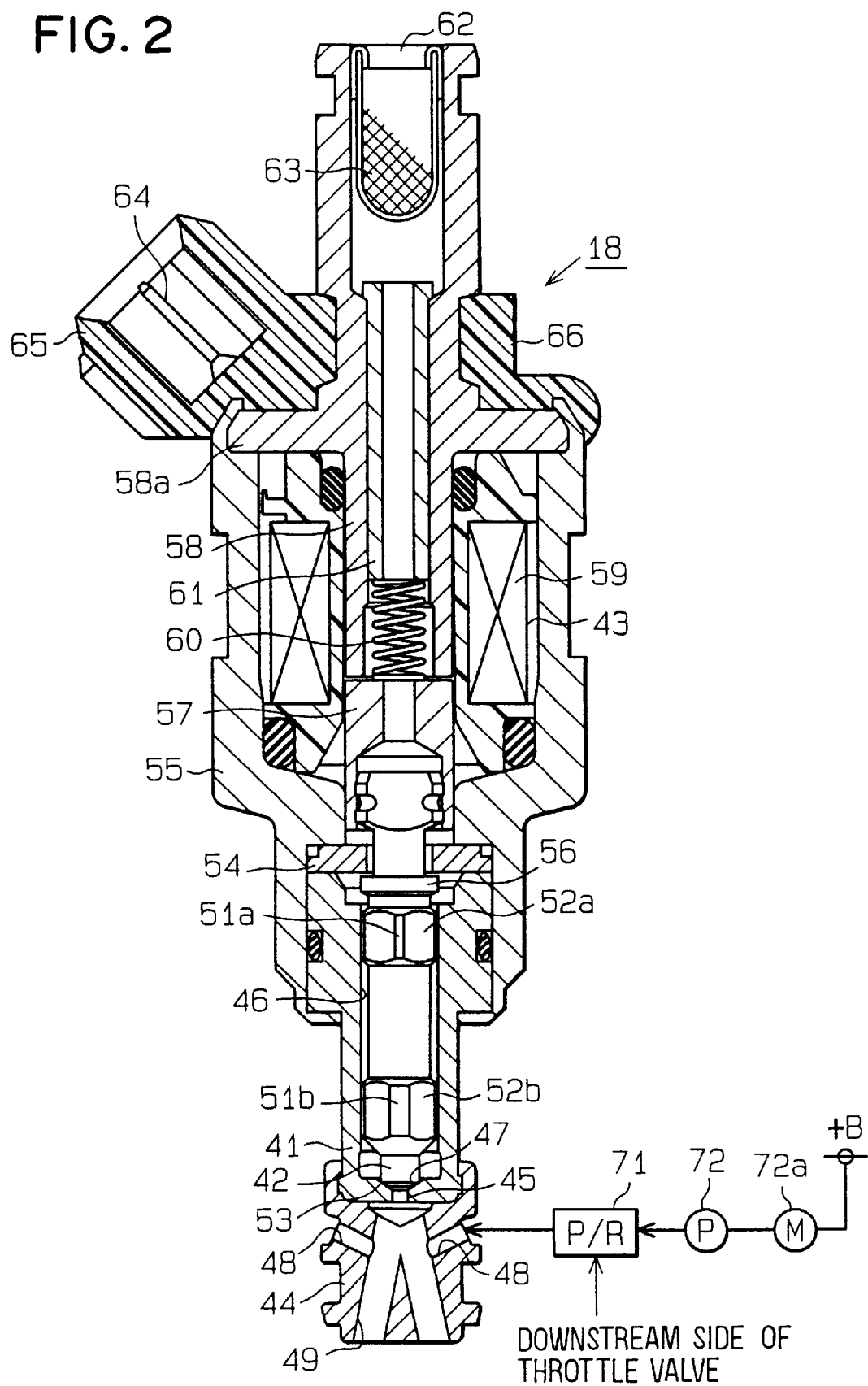
FIG. 2 is a sectional view of an air-assisted type fuel injector used in the first embodiment.

As shown in FIG. 2, the injector 18 of this embodiment is constructed into a normally-closed type. The injector 18 has a valve body 41, a valve member 42, an electromagnetic actuator 43 and an air-assisting adapter 44. In the valve body 41 having a generally cylindrical shape, there are formed at one end thereof an injection port 45 for injecting the fuel into the cylinder 2 and inside thereof a sliding bore 46 for housing the valve member 42 slidably. Between the injection port 45 and the sliding bore 46 of the valve body 41, there is formed a valve seat 47 which has a conical face.

The air-assisting adapter 44 is mounted on the valve body 41 on the side of the injection port 45 to guide the fuel, as injected from the injection port 45, into the injection pipe 2. In the air-assisting adapter 44, there are formed a plurality of air introduction holes 48 for introducing auxiliary air to promote the fuel atomization. Further formed in the air-assisting adapter 44, there are formed branched passages 49 for injecting the mixture of the fuel, as injected from the injection port 45, and the auxiliary air, as introduced from the air introduction holes 48, into a plurality of branch directions at a predetermined angle. The branched passages 49 is bifurcated toward the center of faces 14*a* of the two intake valves 14 of each cylinder so that totally twelve injection ports are formed in the lower end face of the air-assisting adapter 44.

To the air introduction holes 48 of the air-assisting adapter 44, there is connected a pressure regulator 71 for regulating the pressure of the air to be fed to the holes 48. This air feed pressure is regulated to establish a predetermined pressure difference from the pressure at the downstream of the throttle valve of the intake pipe 2. To the pressure regulator 71, there is connected a motor drive type air feed pump 72 to be driven according to the ON operation of the IG key. A motor 72*a* for the air feed pump 72 is activated with the electric power which is fed from a battery power supply +B mounted on the vehicle.

When the air having the predetermined pressure difference from the intake vacuum downstream of the throttle valve is introduced from the air introduction holes 48, this introduction promotes the atomization of the fuel spray, as injected from the injection port 45. This embodiment is constructed such that the air, as pressurized to about 200 to 300 kPa, is continuously fed to the air introduction holes 48 by the pressure regulator 71 and the air feed pump 72. The method of feeding this pressurized air may be exemplified by pressurizing the air by the air feed pump 72 in synchronism with the fuel injection timing. In this case, the air pressurization may be started just before the start of the injection and stopped at the end of the injection. By this method, too, the fuel atomization can be sufficiently effected.

On the needle-shaped valve member 42, there are formed at its two axial positions sliding contact parts 51*a* and 51*b*, which abut against the inner circumference of the sliding bore 46 so that the valve member 42 slides in the sliding bore 46. In this valve member 42, moreover, there are formed flat parts 52*a* and 52*b* at the parts circumferentially adjacent to the sliding contact parts 51*a* and 51*b* so that the fuel can flow through the clearances formed between the flat parts 52*a* and 52*b* and the inner circumference of the sliding bore 46.

On the valve member 42, here is formed an abutment part 53 to abut against the valve seat 47 of the valve body 41, so that the valve member 42 can move between a closed position, in which the abutment part 53 abuts against the valve seat 47 to close the injection port 45, and an open position in which the abutment part 53 is spaced at a predetermined distance from the valve seat 47 to open the injection port 45.

On the upper end face of the valve body 41, on the other hand, there is arranged a ring-shaped stopper 54, through which the valve member 42 extends into the casing 55. Here, there is formed on the valve member 42 a circumferentially bulging flange 56 which is brought into abutment against the stopper 54, when the valve member 42 is pulled up by the drive of the electromagnetic actuator 43, to adjust the open position of the valve member 42.

The electromagnetic actuator 43, as housed in the casing 55, has a core (armature) 57, a stator 58 and a solenoid coil 59. The core 57 is so integrally jointed to the valve member 42 as to move together and is normally biased to the open side (lower side in FIG. 2) of the valve member 42 by a return spring 60. The stator 58, as made of a cylindrical magnetic member, is arranged coaxially with the core 57 and is fixed on the casing 55 by clamping its flange part 58*a* on the end part of the casing 55. In the stator 58, there is arranged a cylindrical member 61. Upstream of this cylindrical member 61, there is formed an inlet port 62 for receiving the fuel. A filter 63 is arranged in the inlet port 62.

With the solenoid coil 59, there is connected a terminal 64 for receiving a fuel injection control signal from the ECU 30. This terminal 64 is supported in a connector 65 which is made of a molded resin 66 arranged at the end part of the casing 55.

In the injector 18 thus constructed, the fuel is guided, when introduced from the inlet port 62, through the filter 63, the cylindrical member 61, the core 57 and the clearance between the stopper 54 and the valve member 42 into the sliding bore 46. When the solenoid coil 59 is energized by the ECU 30, a magnetic force is generated to pull the core 57 upward of FIG. 2 against the biasing force of the return spring 60. As a result, the clearance between the valve seat 47 and the abutment part 53 is opened so that the fuel is injected through the injection port 45 and the branched passages 49 into the intake pipe 2.

This system is designed to:

(A) atomize the fuel to flow into the cylinder (i.e., the atomization of the injection fuel);

(B) change the degree of fuel atomization according to the face temperature of the head of intake valve 14 (i.e., the change in the gas particle diameter);

(C) adjust the timing of the fuel flow into the cylinder (i.e., the adjustment of the flow-in timing of the fuel); and (D) divide the fuel injection according to the engine running states (i.e., the divided fuel injection).

Figure 3:
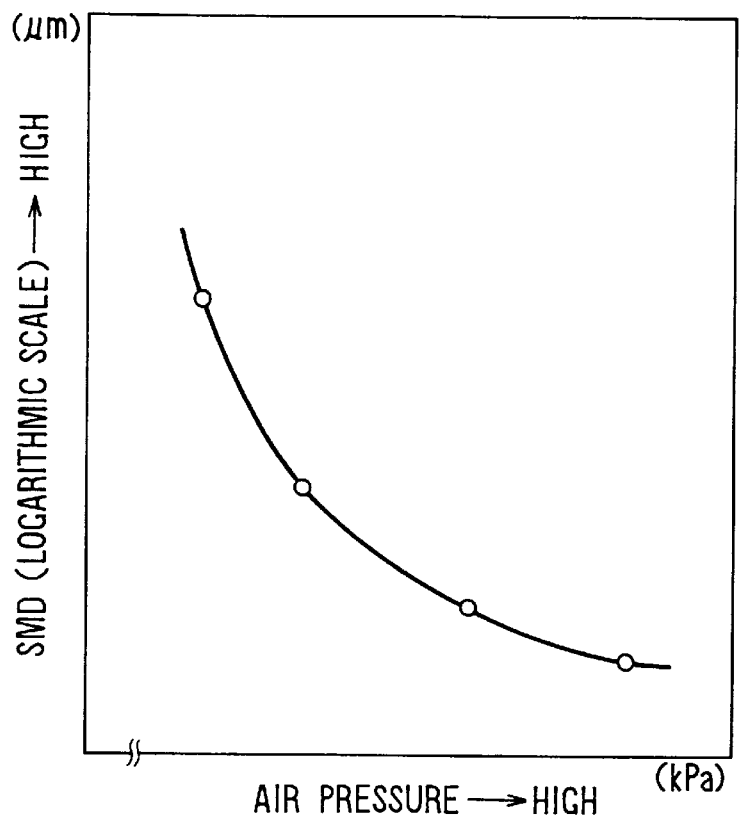
FIG. 3 is a graph showing the relation between a pressurized air pressure of the injector and fuel particle size.

First, (A): atomization of the injection fuel will be described with reference to FIGS. 3 and 4.

Specifically, this embodiment employs the air-assisted type injector 18, and the fuel is atomized to have a gas particle diameter (i.e., Sauter's mean diameter) of about 10 microns by adjusting the pressurized air to be fed to the injector 18. This gas particle diameter SMD has such a relation illustrated in FIG. 3 to the air pressure of the injector 18 that it takes the smaller value to promote the atomization for the higher air pressure.

Since the injector 18 has the multiple (twelve) injection ports, the gas particle diameter SMD is adjusted to about 50 microns in the state of no air-assisted type.

Figure 4:
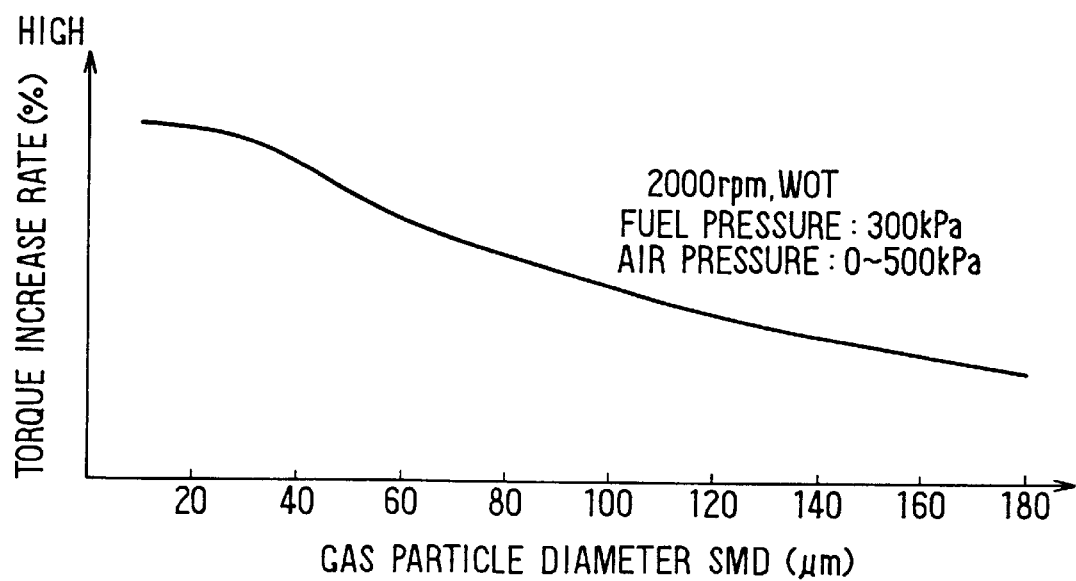
FIG. 4 is a graph showing the fuel particle size and engine torque increase.

FIG. 4 plots the result of the actual test on how effective the gas particle diameter SMD is on the increase in the torque. In FIG. 4, there is plotted on the ordinate the torque increase rate when the gas particle diameter SMD is changed under the conditions of Ne=2,000 rpm and WOT (full load) by adjusting the air pressure (0 to 500 kPa) to the injector 18. At this time, adjustment of the flow-in timing of the fuel is made to introduce the fuel into the cylinder for one third period of the time period T, for which the intake flow rate takes a predetermined or higher vale. As the gas particle diameter SMD becomes the smaller, as plotted in FIG. 4, the torque increase rate rises the higher (by several %).

Next, (B): change in the gas particle diameter will be described with reference to FIGS. 5A, 5B to 7.

In this embodiment, the gas particle diameter SMD is adjusted according to the engine running states. Especially, the temperature of the face (head) 14a of the intake valve 14 (i.e., the face temperature) is estimated from the engine running states, and the gas particle diameter SMD is set to two stages in accordance with the estimated face temperature.

Figure 5A:
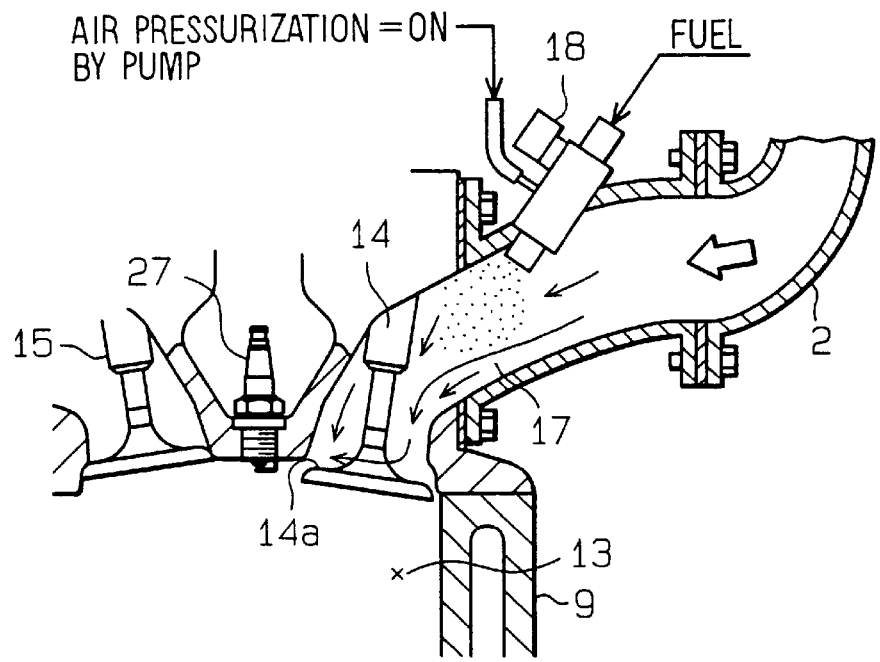
FIGS. 5A and 5B are sectional views showing modes of fuel injection at SMD=10 microns and 50 microns.
Figure 5B:
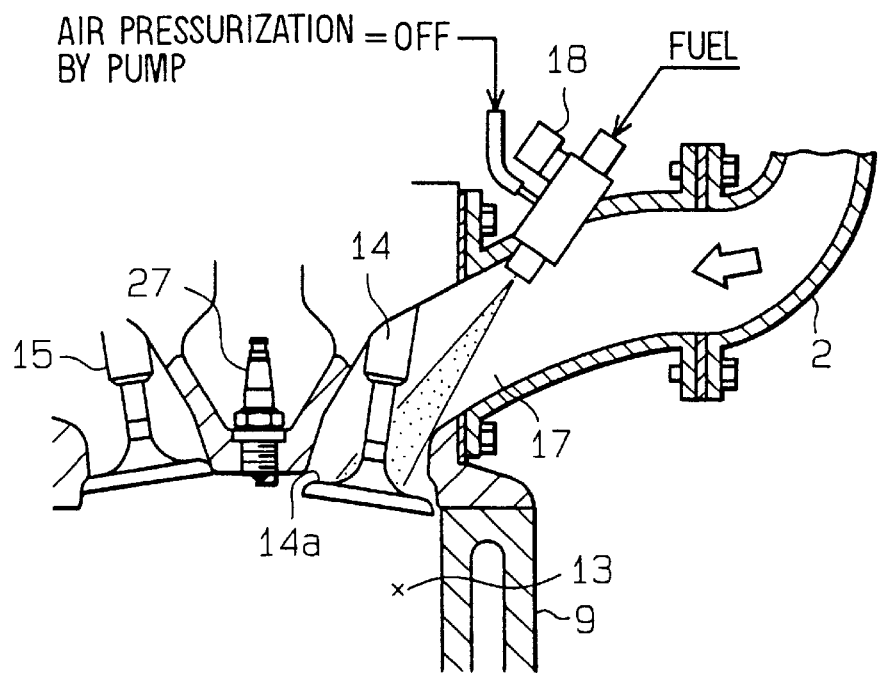

When the face temperature is low, more specifically, the air pressurization by the air feed pump 72 is turned ON, as shown in FIG. 5A, to reduce the gas particle diameter SMD by the air assistance type. At this time, the fuel at the level of SMD=10 microns is injected from the injector 18. When the face temperature is high, on the contrary, the air pressurization by the air feed pump 72 is turned OFF, as shown in FIG. 5B, to atomize the fuel with the heat of the valve face 14a. At this time, the fuel at the level of SMD=50 microns is injected from the injector 18.

That is, the injector 18 injects and feeds the fuel by switching the state, in which the atomization at the level of SMD=10 microns is achieved by the pressurized air assistance, and the state in which the atomization at the level of SMD=50 microns is achieved from the multiple holes by stopping the pressurized air assistance. If the valve face 14a and the port wall face near the valve are hot, the atomization of SMD=about 10 microns is established by the crushing separation and atomization promotion effects at the impingement against the valve face 14a, even when the fuel having a relatively large particle diameter of SMD=about 50 microns is injected to the vicinity of the valve.

Figure 6:
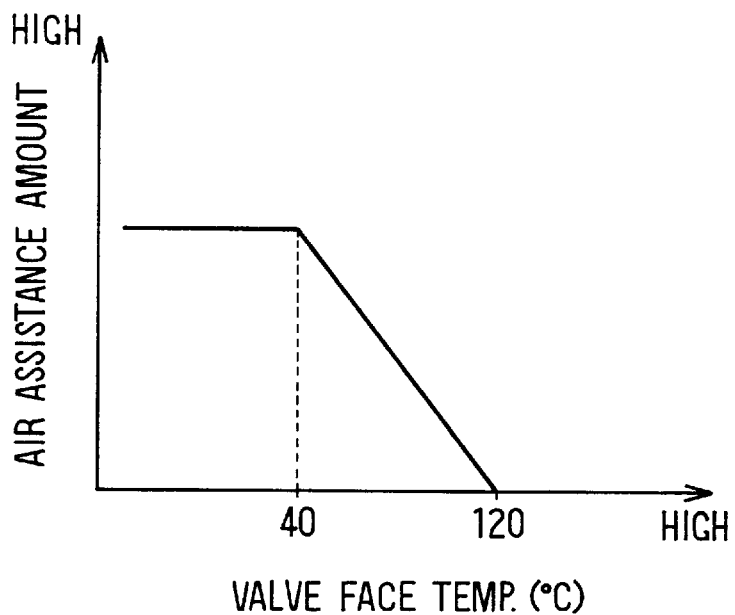
FIG. 6 is a graph showing a valve temperature and air assisting amount.

FIG. 6 illustrates one example a preferred relation between the face temperature and the air assistance amount. According to FIG. 6:

the air assistance amount is set to a maximum value at the face temperature of 40° C. or lower;

the air assistance amount is set to a medium value at the face temperature of 40 to 120° C.; and the air assistance amount is set to "zero" at the face temperature of 120° C. or higher.

Moreover, this embodiment employs the engine speed Ne and the engine load (the intake pressure PM) as the parameters corresponding to the face temperature of the intake valve 14. In accordance with these engine speed and load, there are set the engine running region (air assistance required region), in which the air assistance by the air feed pump 72 is required, and the engine running region (air assistance non-required region) in which the air assistance is not required.

Figure 7:
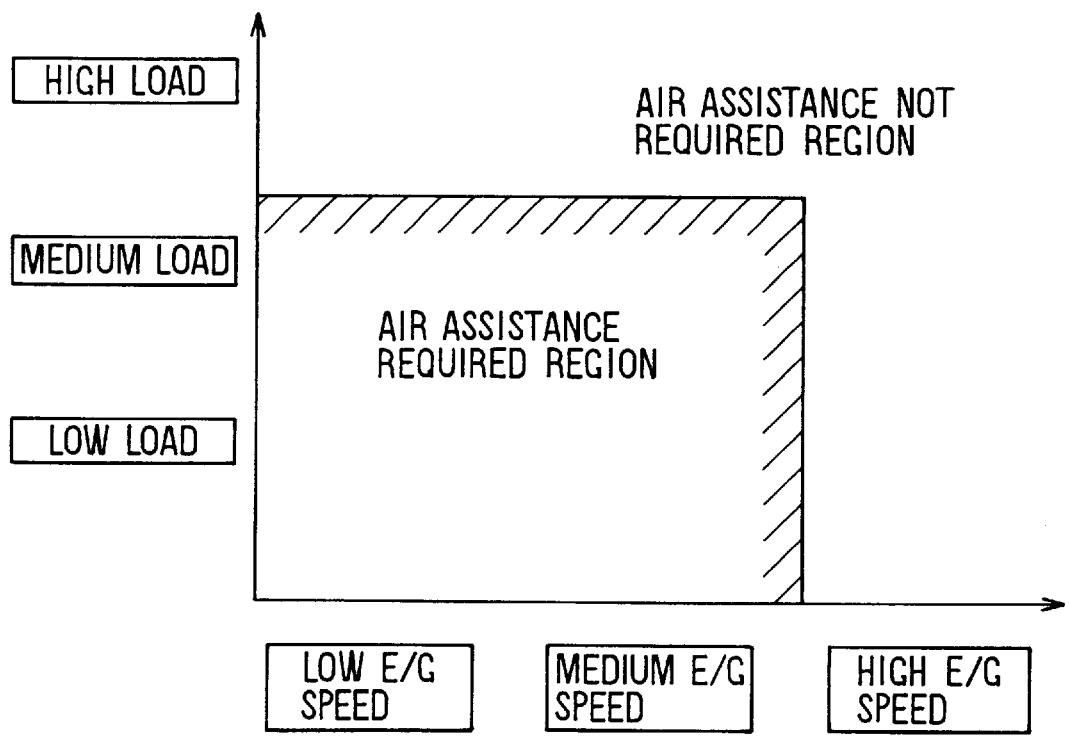
FIG. 7 is a graph showing regions where air assistance is required and not required.

FIG. 7 is a map presenting the air assistance required region and the air assistance non-required region. In FIG. 7, the air assistance required region is set in the region of low/medium speeds and low/medium loads of the engine 1, and the air assistance non-required region is set in the region of high speed and high load of the engine 1.

Next, (C): adjustment of the flow-in timing of the fuel will be described with reference to FIGS. 8A, 8B, 8C to 11.

In order to enhance the efficiency of charging the intake air into the engine cylinder, it is desirable to inject the fuel into the cylinder by the injector 18 at the beginning of the suction stroke, as reasoned in the following. When the fuel is sucked at the beginning of the suction stroke, its atomization is accelerated so that the air temperature is lowered by the heat of vaporization to increase the weight (density) of the air at a unit volume to be sucked into the cylinder. As a result, the charging efficiency of the intake air can be enhanced, and the fuel injection state can be stabilized to improve the engine output torque.

FIGS. 8A, 8B and 8C presents time charts illustrating the valve lift amount accompanying the opening operations of the intake and exhaust valves 14 and 15, the fuel injection timing of the injector 18, and the change in the intake flow velocity accompanying the opening operation of the intake valve 14. On the abscissa of the drawing, there are indicated the TDC (top dead center) and the BDC (bottom dead center) for one cycle of the piston 10. As a matter of fact, the intake flow velocity begins to rise with a slight delay from the opening timing of the intake valve 14, but these two timings are illustrated as synchronized.

In FIGS. 8A, 8B and 8C, the exhaust valve opens just before the BDC and closes just after the TDC (intake TDC). On the other hand, the intake valve 14 opens just before the intake TDC and closes just after the BDC. At this time, the time period, for which the intake flow velocity exceeds a predetermined threshold value Vr as the intake valve 14 opens, is indicated by "T" in FIGS. 8A, 8B and 8C. This period T corresponds to the period for which the valve lift amount of the intake valve 14 exceeds about 20% of that of the fully open time (at 100%).

In this embodiment, moreover, the fuel is injected into the cylinder by the injector 18 for the first "one third period" of the period T. At this time, the atomized fuel, as injected by the injector 18, is entrained in the intake air into the cylinder at the initial stage of the intake valve opening time. Here, the actual fuel injecting timing by the injector 18 is counted back such that the fuel flow into the cylinder is timed with the "T/3" period of FIGS. 8A, 8B and 8C. That is, the delay time till the fuel injected at the intake port 17 arrives at the intake valve 14 is estimated to time the fuel injection accordingly earlier.

Thus, the fuel is injected into the cylinder for the "T/3" period, for which the valve lift amount is over 20%, that is, for which the intake flow velocity exceeds the predetermined threshold value Vr, so that the charging efficiency of the intake air is enhanced to improve the output torque of the engine 1. According to the above fuel feeding method, moreover, the torque can be drastically increased without increasing the unburned HC.

Figure 9:
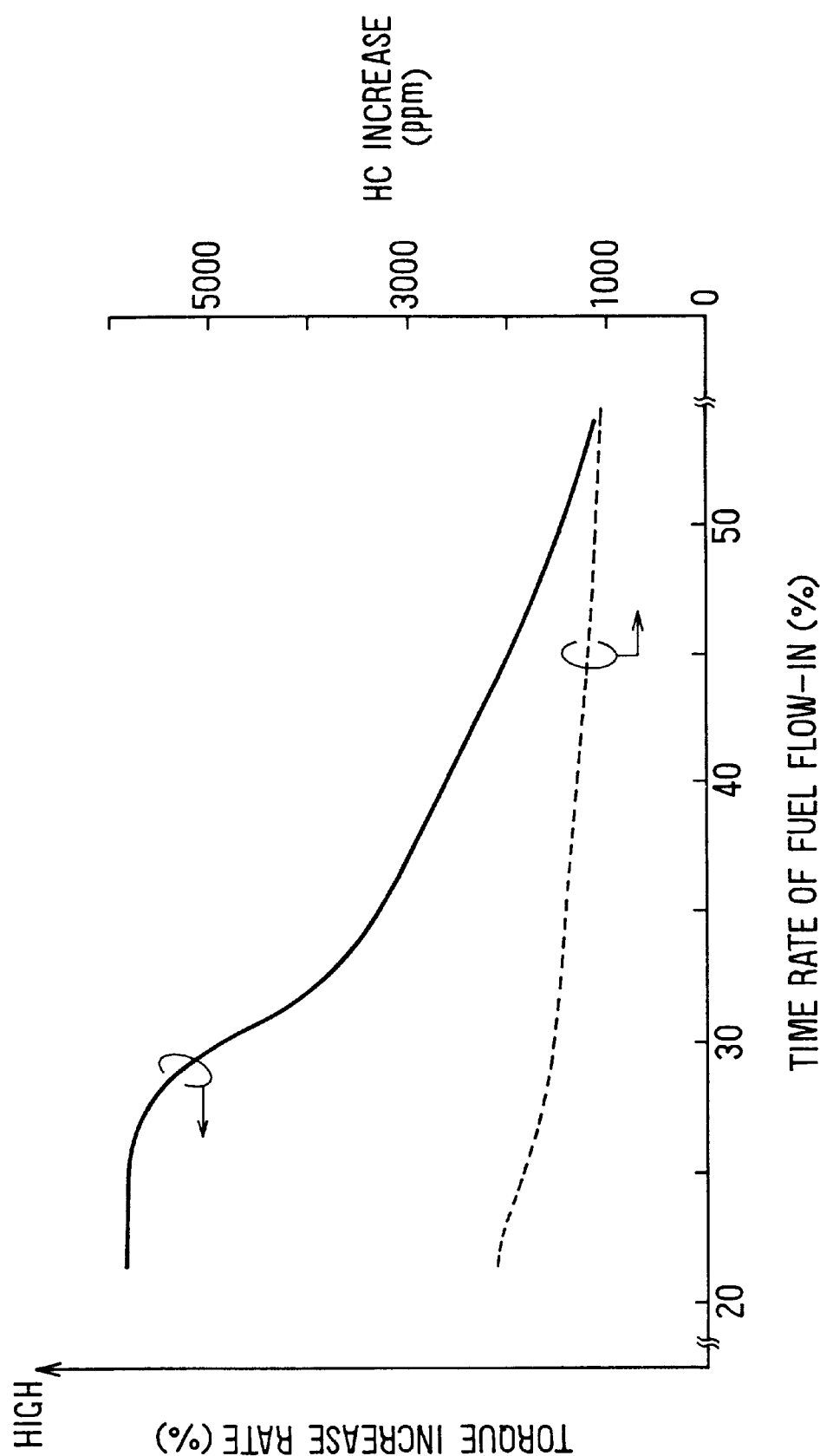
FIG. 9 is a graph showing a relation between a fuel flow-in time rate and a torque increase rate.

FIG. 9 plots the experimental data for substantiating that the torque can be increased without increasing the unburned HC. In FIG. 9, the abscissa indicates the time rate (=the actual fuel flow time/the total time of the lift amount of the intake valve over 20%) of the fuel flow into the cylinder at the beginning of the suction stroke, and the ordinate indicates the torque increase rate and the HC increase. It is seen from FIG. 9 that the maximum torque increase rate can be achieved if the time rate of the fuel flow-in is made lower than about 30%. However, if the time rate of the fuel flow-in made excessively low, that is, if the fuel flow-in at the initial stage of the suction stroke is excessively concentrated for a short time, the wetness of the cylinder may increase to turn the tendency for the unburned HC to increase. In order to suppress the increase in the unburned HC and to aim at the maximum torque increase rate, therefore, it is desirable to set the time rate of the fuel flow-in to about 25 to 30%. For this reason, in this embodiment, the fuel is injected into the cylinder for the initial one third of the period for which the intake flow velocity exceeds the predetermined threshold value.

When the fuel is fed to each cylinder by this method, it can be easily entrained in the air flow when the intake valve 14 opens, so that it makes the intake port 17 less wet (port wetting) to reduce the air-fuel spike drastically at the engine operation transition. Moreover, this effect to reduce the air-fuel spike can be far more enhanced by adjusting the gas particle diameter SMD to a predetermined value. The actual test result is described with reference to FIG. 10. In the experiments shown in FIG. 10, the lean spike or the rich spike of the air-fuel ratio was caused by raising or lowering the intake pipe pressure under the condition of no low temperature correction from the states of Ne=2,000 rpm, Tw=20° C. and the air-fuel ratio=stoichiometry.

Figure 10:
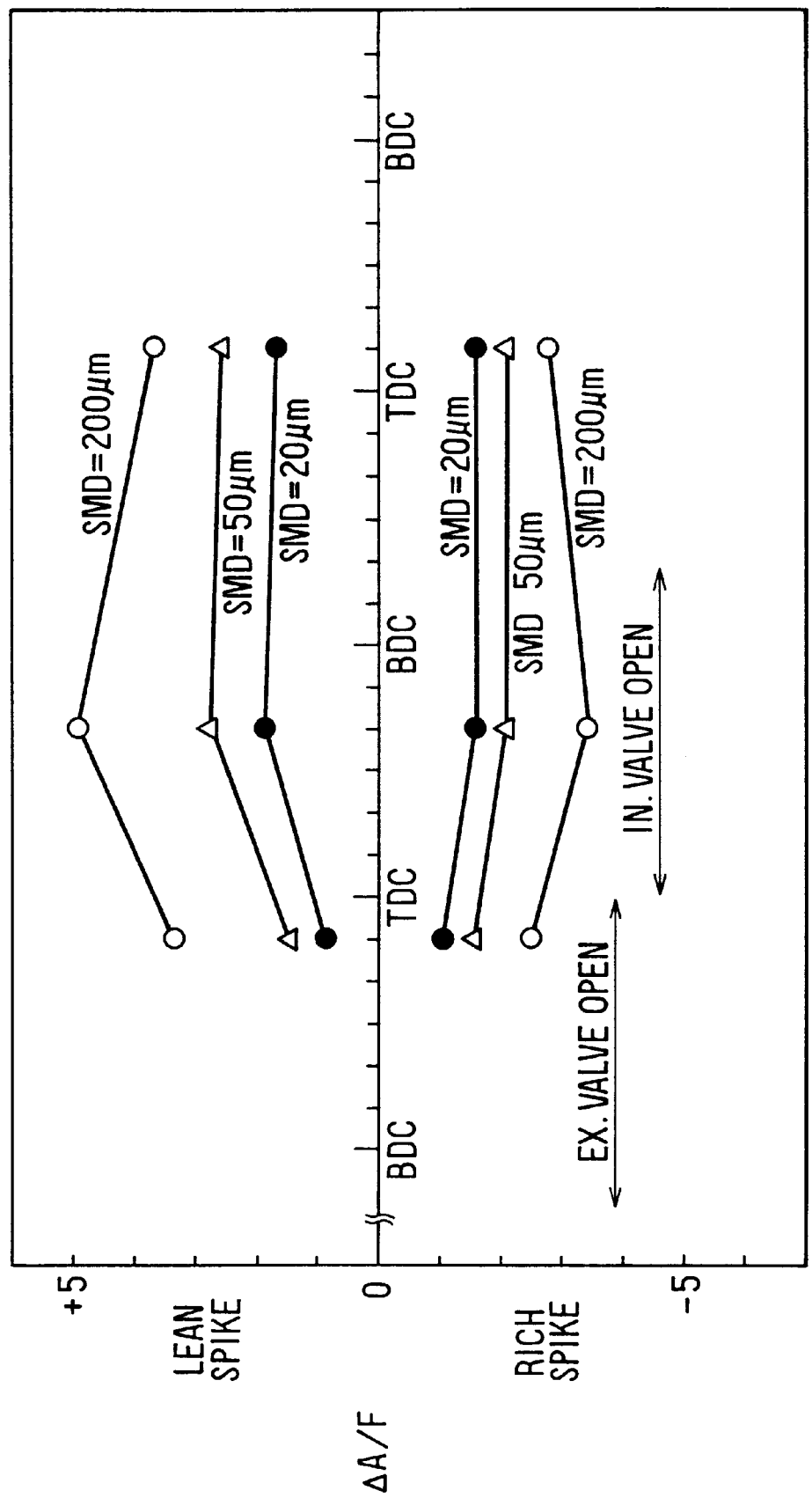
FIG. 10 is a graph showing a relation between the fuel injection timing and air-fuel ratio deviation with regard to various fuel particle size.

On the ordinate of FIG. 10, there are plotted the air-fuel ratio deviation amounts ΔA/F to the lean side or the rich side at the lean or rich spike for the gas particle diameter SMD of 20 microns, 50 microns and 200 microns. The abscissa of FIG. 10 indicates the crank angle of the engine 1, against which there are plotted the deviation amounts ΔA/F at the crank angles by setting the injection ending timings estimating the time period till the fuel flow into the cylinder at 30 degrees CA before the intake TDC, at 120 degrees CA (i.e., the intake valve open center) after the intake TDC, and at 30 degrees CA after the compression TDC.

It is found from FIG. 10 that the air-fuel ratio deviation amounts ΔA/F become the smaller as the gas particle diameter SMD is the smaller, no matter whether the spike might be lean or rich. It is also found that the air-fuel ratio deviation amounts ΔA/F become the smallest when the injection end is so timed before the intake valve that the fuel may flow into the cylinder at the beginning of the suction stroke. This is because the fuel is entrained in the flow of the intake air without wetting the intake port 17 into the cylinder by ending the injection before the intake valve open. As a result, the exhaust emission is suppressed from being worsened due to the air-fuel ratio deviation at a transition time. It has been confirmed that this phenomenon can be likewise achieved even when the cooling water temperature Tw is as high as 80° C.

Figure 11A:
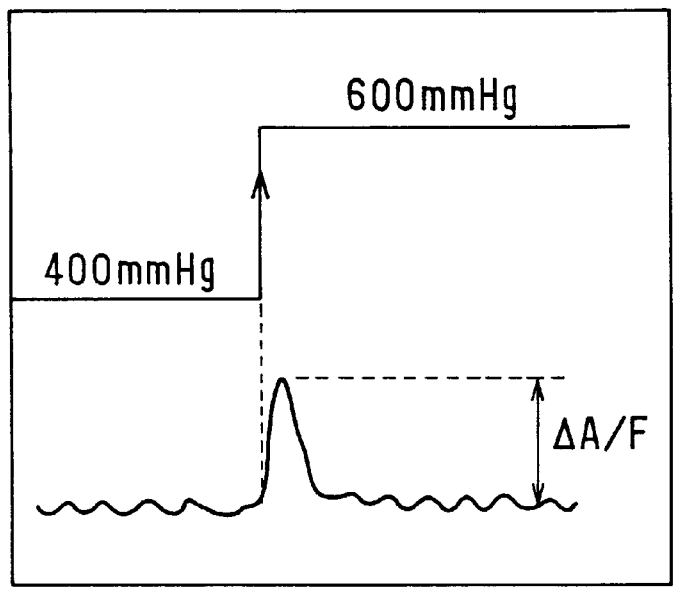
FIGS. 11A and 11B are time charts showing a lean spike and a rich spike in air-fuel ratio at engine transient operation, respectively.
Figure 11B:
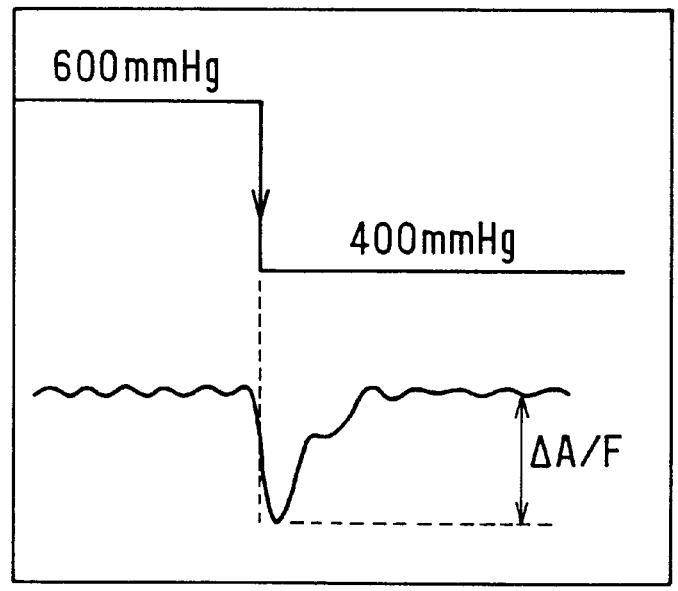

In these experiments, at the lean spike of the air-fuel ratio, the intake pipe pressure is stepwise changed from 400 mmHg to 600 mmHg, as illustrated in FIG. 11A. At the rich spike of the air-fuel ratio, on the contrary, the intake pipe pressure is stepwise changed from 600 mmHg to 400 mmHg, as illustrated in FIG. 11B.

In the experiments visualizing the fuel atomization of the intake port 17, moreover, it has been observed that an excellent spray was formed so that the mixture ideally flew into the cylinder when the atomized fuel was injected just before (at 30 degrees CA before the intake TDC) the opening of the intake valve 14.

Next, (D): divided fuel injection will be described with reference to FIGS. 12A, 12B, 12C, 12D to 14.

Figure 8:
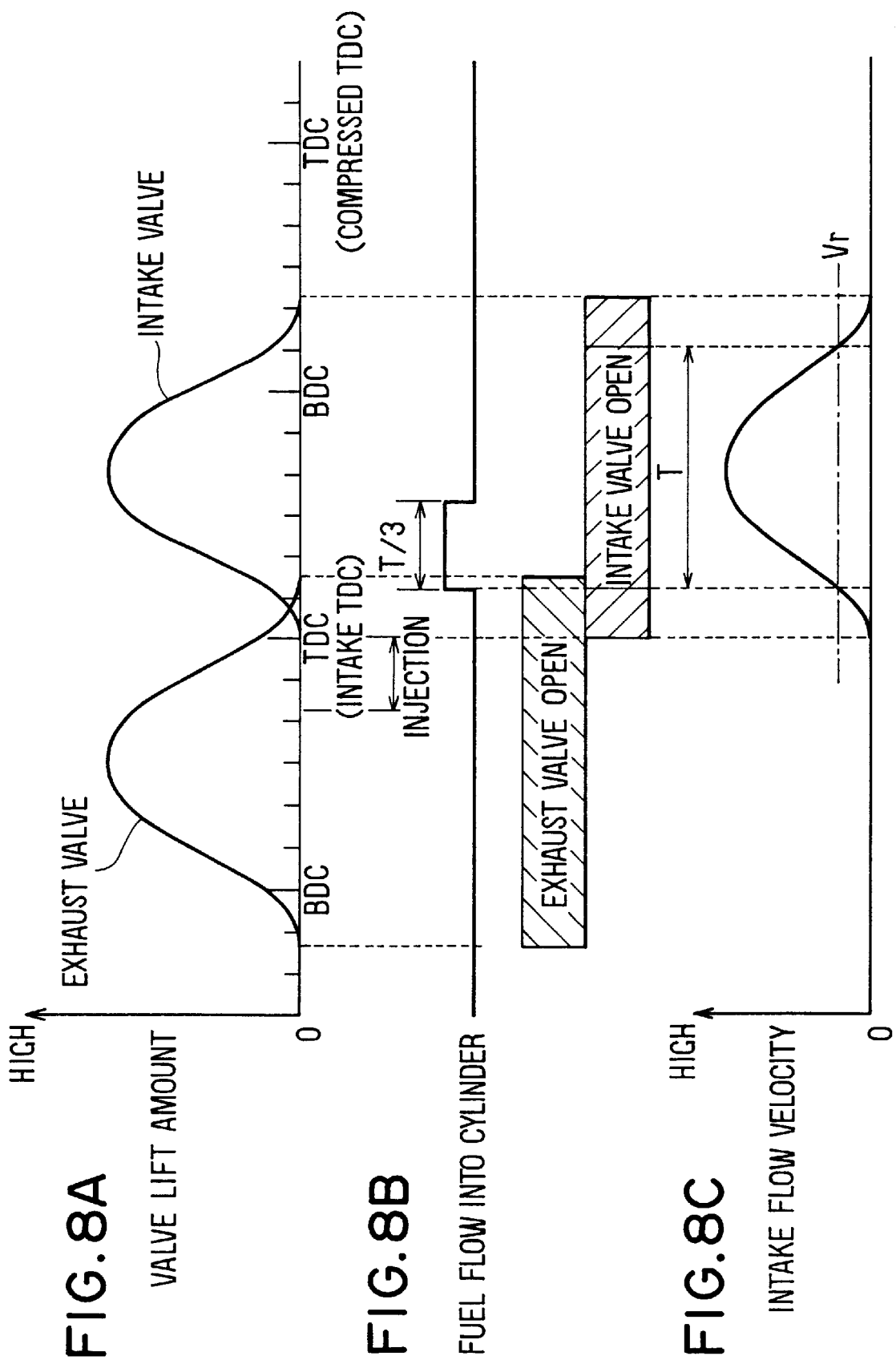
FIGS. 8A, 8B and 8C are time charts showing valve lifts of intake and exhaust valves, fuel injection timing of the fuel injector and intake air flow velocity, respectively.
Figure 12A:
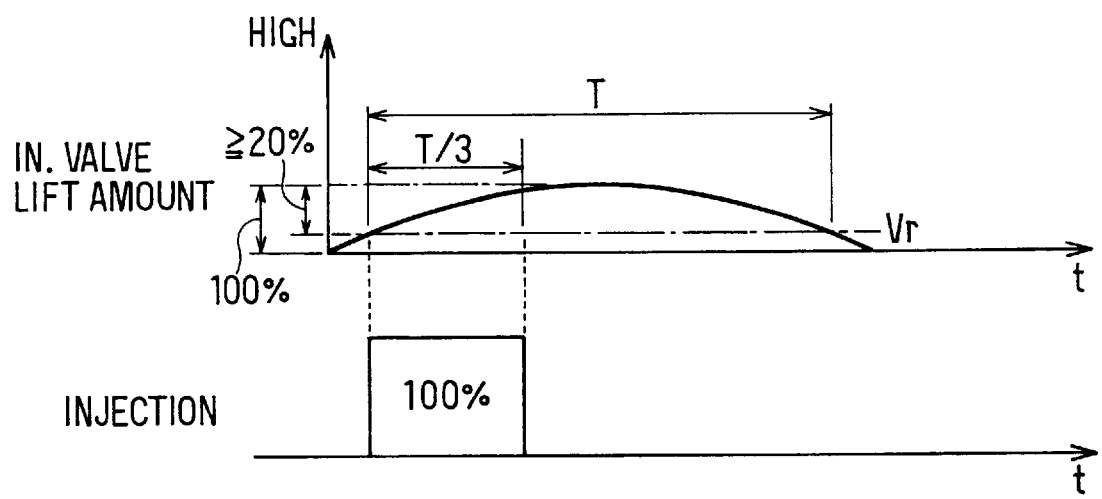
Figure 12B:
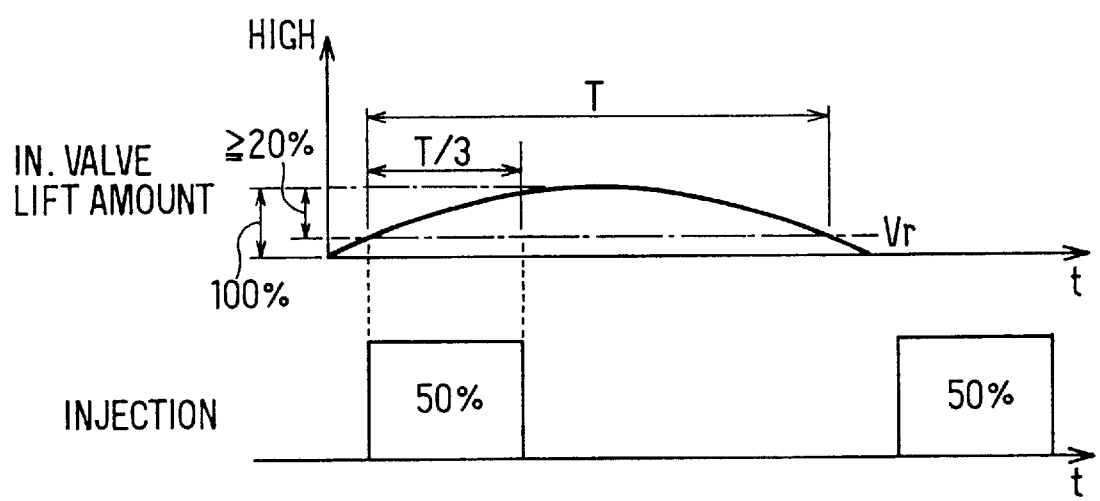

In short, the time period, as indicated at "T/3" in FIG. 8, becomes the shorter for the higher engine speed. For the higher engine load, on the other hand, the fuel injection amount for the period "T/3" likewise increases the more. If, in this case, the fuel is injected all (100%) at once into the cylinder for the same time period "T/3", the exhaust emission of the unburned HC may increase. In this embodiment, therefore, there are set: a mode (single or batch injection mode) in which the fuel is injected all (100%) at once within the "T/3" time period, as illustrated in FIGS. 12A and 12B, and a mode (divided or split injection mode) in which about 50% of all the fuel is injected within the "T/3" time period whereas the remaining about 50% is injected at other than the suction stroke, as illustrated in FIGS. 12C and 12D.

At the fuel injection timing shown in FIGS. 12A to 12D, however, the fuel is injected in fact from the injector 18 into the intake port 17 earlier by its flight time. For conveniences of description, the illustrations are made by neglecting flight time of the injected fuel in FIGS. 12A to 12D.

Figure 13:
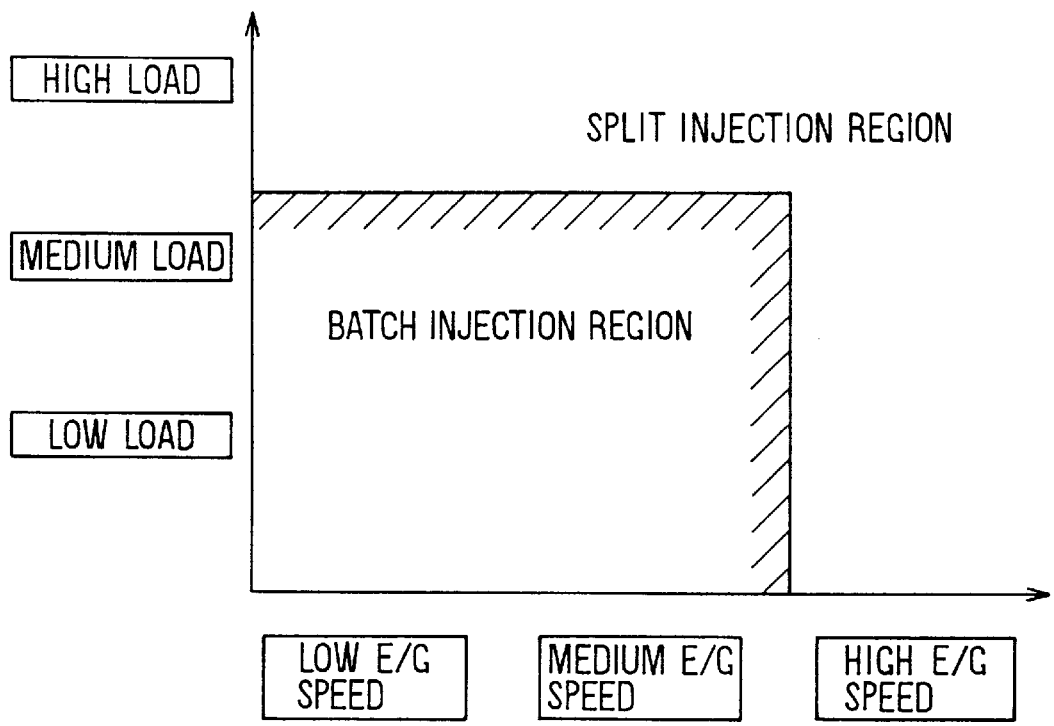
FIG. 13 is a graph showing regions of the batch injection and the split injection according to engine states.

FIG. 13 is a map showing the speed region and the load region of the engine 1 for selecting the batch injection mode and split injection mode. In FIG. 13, the low/medium engine speed and low/medium load region as hatched in FIG. 13 indicates the region (batch injection region) in which the fuel is injected in the batch injection mode by the injector 18, and the high engine speed or high load region indicates the region (split injection region) in which the fuel is injected in the split injection mode by the injector 18.

By thus executing the divided fuel injection in the high engine speed or high load region, it is possible to avoid the cylinder wetting which might otherwise be caused when a large amount of fuel is injected and fed within a short time. As a result, it is possible to avoid the disadvantage of the reduction in engine torque or the HC emission which might otherwise be caused by the cylinder wetting.

Here, in order to realize the fuel flow-in for the "T/3 period" in the entire region of the engine run, it is necessary to change the fuel injection rate per unit time by the injector 18 in accordance with the running conditions. In the case of the batch injection mode, specifically, the injection flow rate per unit time of the injector 18 may be low at the low engine speed and under the low load. As the engine speed or load increases, however, it is necessary to increase the injection flow rate per unit time of the injector 18. In this embodiment, therefore, a command current (pump current) to the fuel pump 26 is controlled to make variable the pressure (fuel pressure Pf) of the fuel to be fed to the injector 18 thereby to adjust the injection flow rate per unit time.

Figure 14:
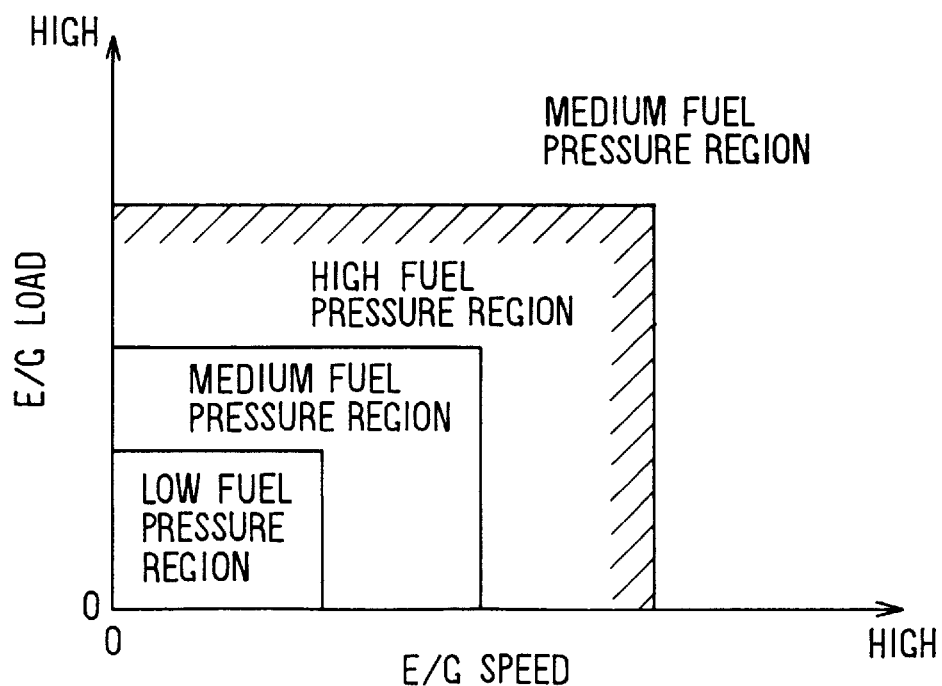
FIG. 14 is a graph showing fuel pressure region according to the engine states.

FIG. 14 is a map for setting the fuel pressure Pf in accordance with the engine speed and the engine load. The hatched region of FIG. 14 is identical to the batch injection region of the map of FIG. 13. In this region, there are set the low fuel pressure region, the medium fuel pressure region and the high fuel pressure region in accordance with the engine speed and the engine load. Here in the region (high engine speed and high load region) corresponding to the split injection region of FIG. 13, the medium fuel pressure region is set.

Figure 15:
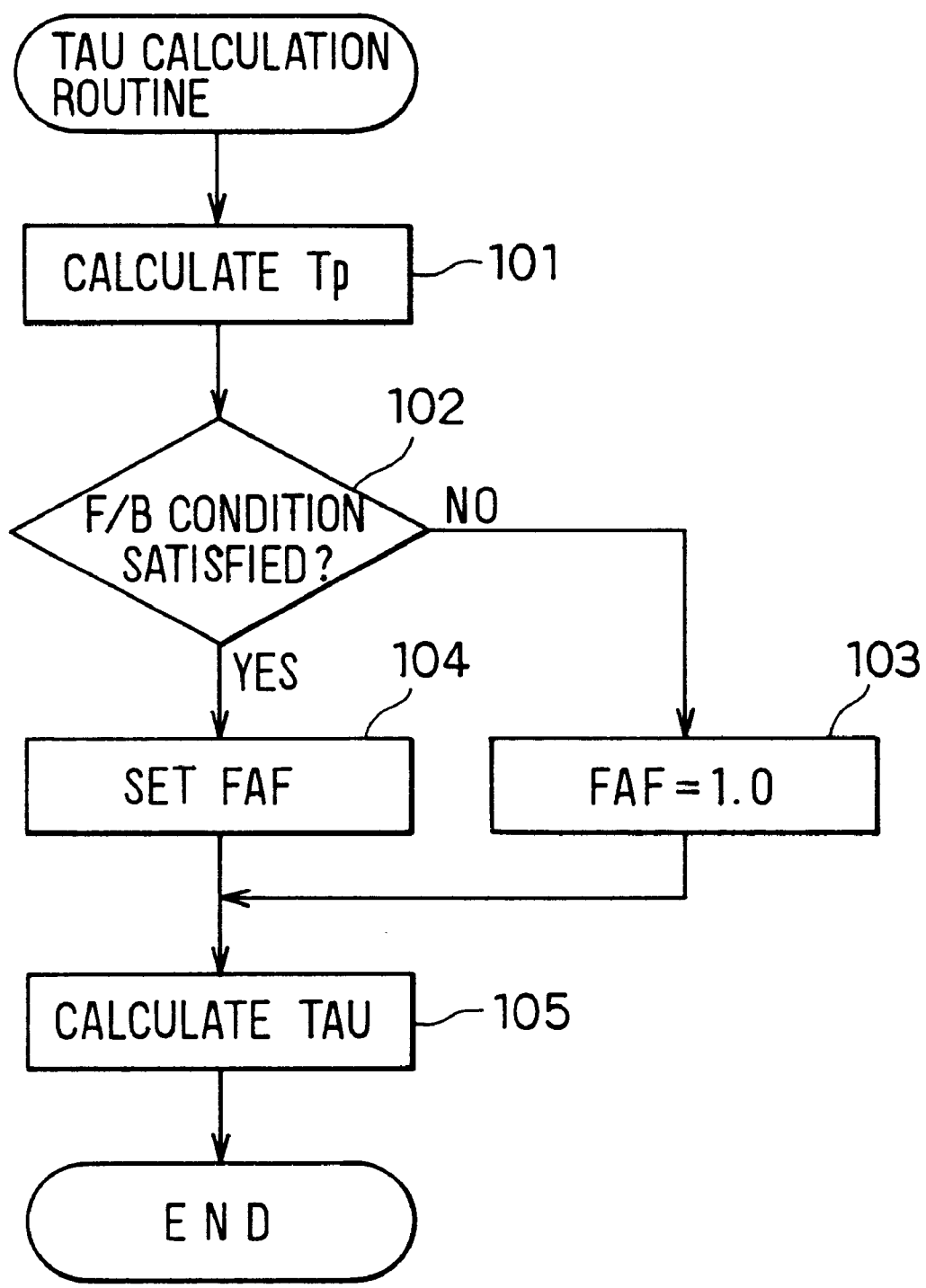
FIG. 15 is a flow chart showing a TAU calculation routine executed in the first embodiment.
Figure 16:
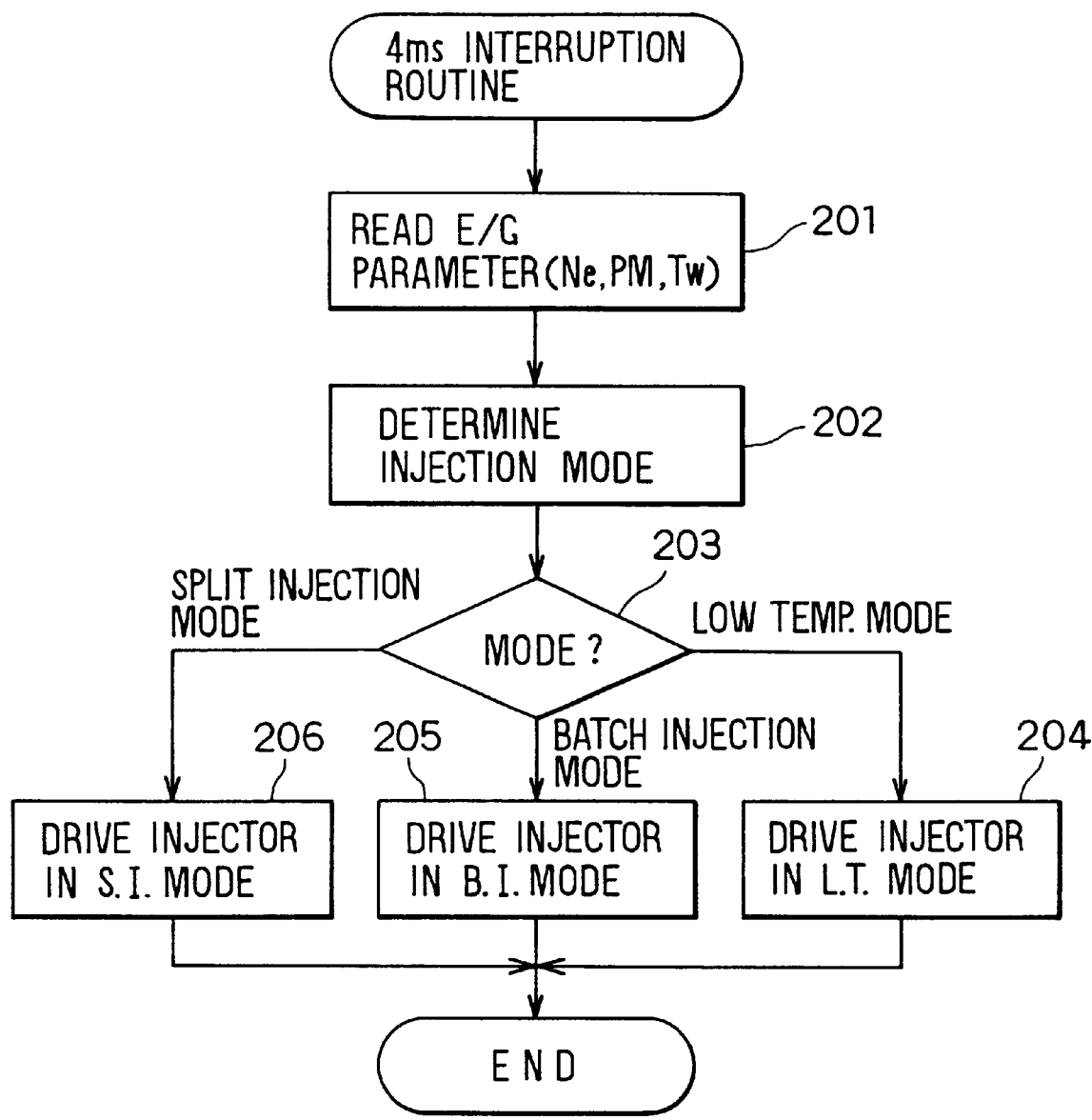
FIG. 16 is a flow chart showing a 4 ms interruption routine for switching injection mode in the first embodiment.
Figure 17:
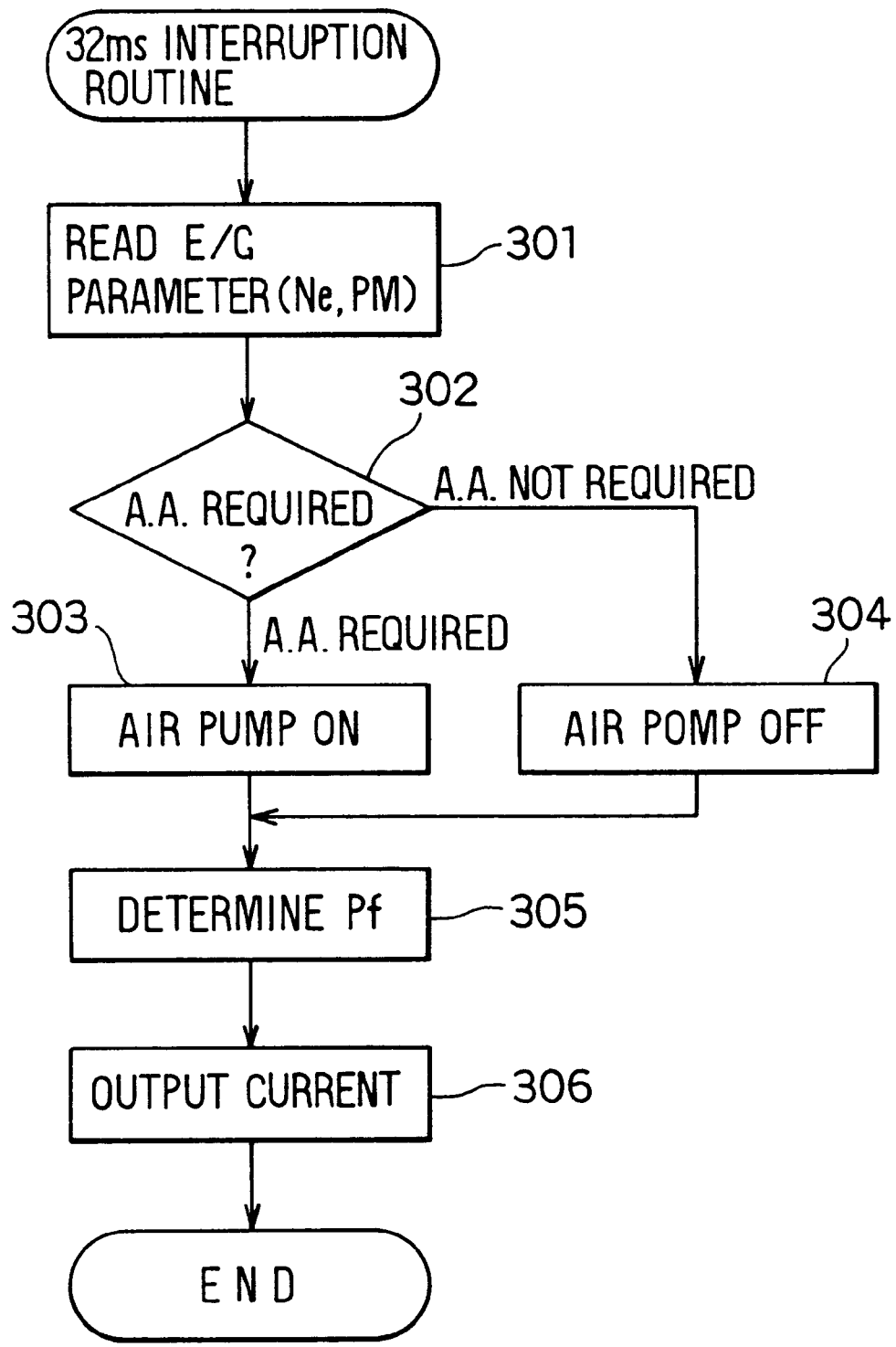
FIG. 17 is a flowchart showing a 32 ms interruption routine for fuel pressure control in the first embodiment.

To attain the above operations, the CPU 31 in the ECU 30 is programmed to execute the processing shown in FIGS. 15 to 17.

FIG. 15 is a flow chart showing a routine for calculating a final fuel injection time TAU. This routine is executed by the CPU 31 in synchronism with (at every 180 degrees CA in this embodiment) of the fuel injection of each cylinder.

Moreover, FIG. 16 is a 4 ms interruption routine for controlling the drive of the injector 18, and FIG. 17 is a flow chart showing a 32 ms interruption routine for controlling the air assistance and the fuel pressure Pf.

When the TAU calculating routine of FIG. 15 is started, the CPU 31 calculates at first Step 101 a fundamental injection time Tp of the fuel according to the engine speed Ne and the intake pressure PM at that time by using the fundamental injection amount map which is stored in advance in the ROM 32. Then, the CPU 31 decides at Step 102 whether or not the well-known air-fuel ratio feedback (F/B) condition is satisfied. Here, the air-fuel ratio F/B condition includes that the cooling water temperature Tw is at the predetermined or high level, that the engine running states are not the high speed/load state, and that the A/F sensor 16 is active.

If the answer of Step 102 is NO, the CPU 31 advances to Step 103, at which the air-fuel ratio correction coefficient FAF is set to "1.0". In other words, FAF=1.0 means that the air-fuel ratio is subjected to the open loop control (no feedback control). If the answer of Step 102 is YES, the CPU 31 advances to Step 104, at which the air-fuel ratio correction coefficient FAF is set.

In this embodiment, the air-fuel ratio F/B control on the basis of the advanced control theory is executed. For this F/B control, the air-fuel ratio correction coefficient FAF for making the detected result of the A/F sensor 16 conform to the target air-fuel ratio is calculated by using the following formulas (1) and (2).

$$FAF = K1 \cdot \lambda + K2 \cdot FAF1 + \ldots + Kn+1 \cdot FAFn + ZI \quad (1);$$

and $$ZI = ZI1 + Ka \cdot (\lambda TG - \lambda) \quad (2).$$

In these Formulas: $\lambda$: an air-fuel ratio conversion value of the limiting current by the A/F sensor 16; $\lambda TG$: the target air-fuel ratio; K1 to Kn+1: the F/B constants; ZI: an integration term; and Ka: an integration constant. Moreover, suffixes 1 to n+1 designate variables indicating the number of controls from the sampling start.

After the setting of the FAF value, the CPU 31 uses the following formula (3) at Step 105 to calculate the final fuel injection time TAU from the fundamental injection time Tp, the air-fuel ratio correction coefficient FAF, other correction coefficients FALL (e.g., the various correction coefficients for the water temperature, the air conditioning load and so on), and an invalid injection time Tv.

$$TAU = Tp \cdot FAF \cdot FALL + Tv \quad (3).$$

After this calculation of the fuel injection time TAU, the CPU 31 once ends this routine.

When the 4 ms interruption routine of FIG. 16 is started, moreover, the CPU 31 reads the engine running states including the engine speed Ne, the intake pressure PM and the cooling water temperature Tw at first Step 201 and determines the fuel injection mode on the basis of the read running states at subsequent Step 202. Upon this determination of the fuel injection mode, the map of FIG. 13 is basically employed to select either of the "batch injection mode" or the "split injection mode" in accordance with either what of the low, medium or high region the engine speed Ne belongs to or what of the low, medium or high region the engine load (e.g., the intake pressure PM) belongs to. In this embodiment, however, the two fuel injection modes are not adopted at the low temperature start of the engine 1, for example, but the fuel injection is performed in the "low temperature mode". At the time of determining the mode of Step 202, one fuel injection mode is selected from the above-specified three modes including the low temperature mode.

After this, the CPU 31 decides the determined fuel injection mode. If, in this case, the engine 1 is at the low temperature starting time so that the "low temperature mode" is decided, the CPU 31 advances to Step 204, at which the injector 18 is driven in the low temperature mode to execute the fuel injection. This injection drive in the low temperature mode corresponds to the fuel injecting operation of the conventional system, in which the fuel injection is executed before the suction stroke and in which the fuel is injected throughout the suction stroke.

When the "batch injection mode" is decided, on the other hand, the CPU 31 advances to Step 205, at which the injector 18 is driven to execute the fuel injection in the batch injection mode. In this batch injection mode, as described with reference to FIG. 12A, the fuel injection is timed to one third of the first half of the suction stroke (as earlier by the flight time period of the fuel, as a matter of fact).

When the "split injection mode" is decided, the CPU 31 advances to Step 206, at which the injector 18 is driven to execute the fuel injection in the split injection mode. In this split injection mode, as described with reference to FIG. 12B, the fuel injection is timed to one third of the first half of the suction stroke and to a predetermined time after the suction stroke (as earlier by the flight time period of the fuel, as a matter of fact).

At the foregoing Steps 204, 205 and 206, the CPU 31 outputs the drive signals corresponding to the individual injection modes, to an injector drive circuit (not shown), and the routine of FIG. 16 is once ended after the operations of those individual Steps.

When the 32 ms interruption routine of FIG. 17 is started, on the other hand, the CPU 31 reads at first Step 301 the engine running states of the engine speed Ne and the intake pressure PM, and decides at next Step 302 whether or not the air-assisted type of the injector 18 by the air feed pump 72 is required. For this decision of the requirement for the air assistance, there is used the map of FIG. 7. In the low/medium speed and low/medium load region of the engine 1, specifically, it is decided, judging the face temperature of the intake valve 14 to be low, that the air assistance is required. In the high speed or high load region of the engine 1, on the other hand, it is judged that the face temperature of the intake valve 14 is relatively high, and it is decided that the air-assisted type is not required.

When the air assistance is required, the CPU 31 turns ON the air feed pump 72 at Step 303. As a result, the motor 72a or the drive source of the pump 72 is driven so that the injected fuel of the injector 18 is atomized by the air assistance. When the air assistance is not required, the CPU 31 turns OFF the air feed pump 72 at Step 304. As a result, the motor 72a of the pump 72 is stopped to interrupt the fuel atomization by the air assistance.

Since, in this case, the combustion temperature is generally high in the high speed or high load region of the engine 1, the face temperature of the intake valve 14 has a tendency to rise. By causing the injected fuel to impinge against the valve surface, therefore, the separation and atomization of the fuel droplets are promoted. However, the fuel partially advances to evaporation, and this evaporated fuel cannot be expected to have the air cooling effect which could be resulted from the evaporation of the fuel particles in the cylinder, but this ratio of the evaporation is thought to be sufficiently small.

After this, the CPU 31 determines at Step 305 the fuel pressure Pf by the fuel pump 26 on the basis of the read running states. For this determination of the fuel pressure Pf, the map of FIG. 14 is employed to select any of the low, medium and high fuel pressures Pf in accordance with the engine speed Ne and the engine load (intake pressure PM). At subsequent Step 306, moreover, the CPU 31 drives the fuel pump 26 with a pump current according to the determined fuel pressure Pf. Thus, the injection flow rate per unit time of the injector 18 is determined. As a result, the batch injection or split injection can be realized irrespective of the fluctuations of the engine speed and the engine load.

The following effects can be achieved according to the first embodiment.

(a) This embodiment is premised by injecting the fuel from the injector 18 to the intake port 17 while aiming at the face 14a of the intake valve 14 and by making the multiple injection ports at the injector to obtain a predetermined gas particle diameter (e.g., an average particle diameter=about 50 microns). Moreover, the air assistance by the air feed pump 72 is required in the low/medium speed and low/medium region where the intake valve 14 is deemed to have a low face temperature, but the air assistance by the air feed pump 72 is not required in the high speed or high load region where that face temperature is deemed high.

In short, the ON/OFF drive of the air feed pump 72 means that the energy load of the engine 1 for atomizing the fuel is changed. Here, if the drive of the air feed pump 72 is turned OFF to stop the fuel atomization, an excessive drop of the battery voltage is suppressed to lighten the load (e.g., the power generation load) of the engine 1. When the fuel atomization by the air-assisted type is stopped, the injected fuel of the injector 18 has a particle diameter of about 50 microns, but the fuel atomization is promoted by the hot valve face 14a so that the fuel to flow into the cylinder is atomized into such a small particle diameter as that (i.e., SMD=about 10 microns) when the air assistance is executed. As a result, the energy at the engine running time can be economized while reducing the particle diameter of the fuel.

In this case, the torque loss is reduced in the high speed or high load running region of the engine so that the accelerating performance is improved, for example, when an acceleration of the vehicle is required.

(b) When the particle diameter is reduced to SMD=about 10 microns by the air assistance of the air feed pump 72, the fuel particles become liable to be entrained by the air flow. This raises an advantage that the restriction on the atomization angle is relaxed to have a relatively rough angular allowance.

(c) In this embodiment, moreover, the drive of the injector 18 is so controlled (as illustrated in FIG. 8) that the fuel injected by the injector 18 may flow into the cylinder for about one first third of the open period of the intake valve 14. According to this construction, most of the fuel flowing into the cylinder is evaporated at an early state so that the evaporation of the fuel flowing into the cylinder is completed till the intake valve 14 is closed to end the suction. At this time, the air temperature is lowered by the evaporation heat of the fuel so that the charging efficiency of the intake air is enhanced and so that the combustion state of the fuel can be stabilized. Moreover, the output torque is improved more than that of the case without that control, if compared under the identical running conditions of the engine 1.

(d) The timing for the injected fuel by the injector 18 to flow into the cylinder is restricted (as illustrated in FIG. 8) within the period for which the speed intake air flow accompanying the opening of the intake valve 14 exceeds the predetermined threshold valve Vr. As a result, the injected fuel of the injector 18 becomes liable to be entrained by the intake air at the intake valve opening time so that the disadvantage for the injected fuel to wet the intake port wall face can be avoided (to reduce the port wetting amount). Since the port wetting amount of the fuel is reduced, there is achieved another effect that the air-fuel ratio spike is drastically reduced at the transient running time of the engine 1.

(e) In accordance with the speed and load states of the engine, moreover, the "batch injection mode" and the "split injection mode" is selectively executed (as illustrated in FIG. 12) as the drive control method of the injector 18. In this case, the emission of the unburned fuel (HC), for example, at the high speed or high load running time of the engine 1 can be suppressed by setting the split injection mode.

(f) An effect to improve the knocking limit can also be achieved because of the drop in the temperature of the intake air, as accompanying the early flow-in of the fuel in the suction stroke and the fuel atomization. In short, the knocking limit can be shifted to an advanced angle side to raise the compression ratio of the engine, for example.

Here, the first embodiment can be modified in the following various manners.

In the first embodiment, there are set in the map of FIG. 7 the "air assistance required region" and the "air-assisted type non-required region" by the air feed pump 72, which may be modified. Within the range of the face temperature of the intake valve 14 from 40 to 120° C., as illustrated in FIG. 6, the characteristics of the air assistance amount required change substantially linearly. Within the region where the face temperature=40 to 120° C. is estimated, therefore, the air assistance amount is gradually varied by using the linear characteristics illustrated in FIG. 6. In this case, the current value of the motor 72a or the drive source of the air feed pump 72 may be gradually varied. Alternatively, the slip ratio of a solenoid clutch is variably controlled in the construction in which the motor 72a and the air feed pump 72 are coupled through the solenoid clutch. For the higher face temperature of the intake valve 14, more specifically, the atomization promoting effect at the valve face becomes the higher so that the fuel is atomized at the valve face 14a by making the gas particle diameter of the fuel by the injector 18 accordingly the larger. This makes it possible to avoid the excess and deficiency of the fuel atomization by the air feed pump 72.

In the first embodiment, the face temperature of the intake valve 14 is estimated indirectly from the engine speed Ne and the engine load (intake pressure PM), which may be changed. It is thought that the combustion temperature and the exhaust gas temperature are in a proportional relation under predetermined conditions. Therefore, the engine exhaust pipe is equipped with an exhaust temperature sensor so that the face temperature of the intake valve 14 is estimated on the basis of the detection result of that sensor.

Alternatively, the air assistance by the air feed pump 72 may be executed while deeming that the face temperature is relatively low only for a predetermined time period and at an idle running time when the engine starts cold.

In the first embodiment, the air feed pump 72 is driven by the motor which is turned ON at the air assistance time and OFF at the other time, as will be modified in the following. For example, the air feed pump 72 is driven by the drive source such as the crankshaft output of the engine. In this case, the crankshaft and the pump 72 are coupled at the air assistance time but are uncoupled at the other time. When the air assistance is stopped, the engine load is lightened to avoid the problem of the deterioration in the fuel economy.

Another device for effecting the fuel atomization may make use of the vibration effect of a piezoelectric element or an ultrasonic oscillator. For example, the voltage to be applied to the piezoelectric element is switched positively and negatively to oscillate the element thereby to atomize the fuel. In this case, the penetration of the fuel atomization becomes less, as compared with that of the case of the atomization using the air pressure. This is because the fuel spray becomes more liable to be entrained by the air flow than the atomization with the air assistance thereby to reduce the port wetting the more.

Moreover, the first embodiment employs the injector of the type having twelve ports. However, the system could embody an injector of the type having four ports.

Second Embodiment

In the first embodiment, the fuel injection mode and the fuel pressure Pf are set according to the engine running states by using the maps of FIGS. 13 and 14. However, this setting is modified in the following manner. For example, a map of FIG. 18 is employed for setting the fuel injection mode, and a map of FIG. 19 is employed for setting the fuel pressure Pf.

Figure 18:
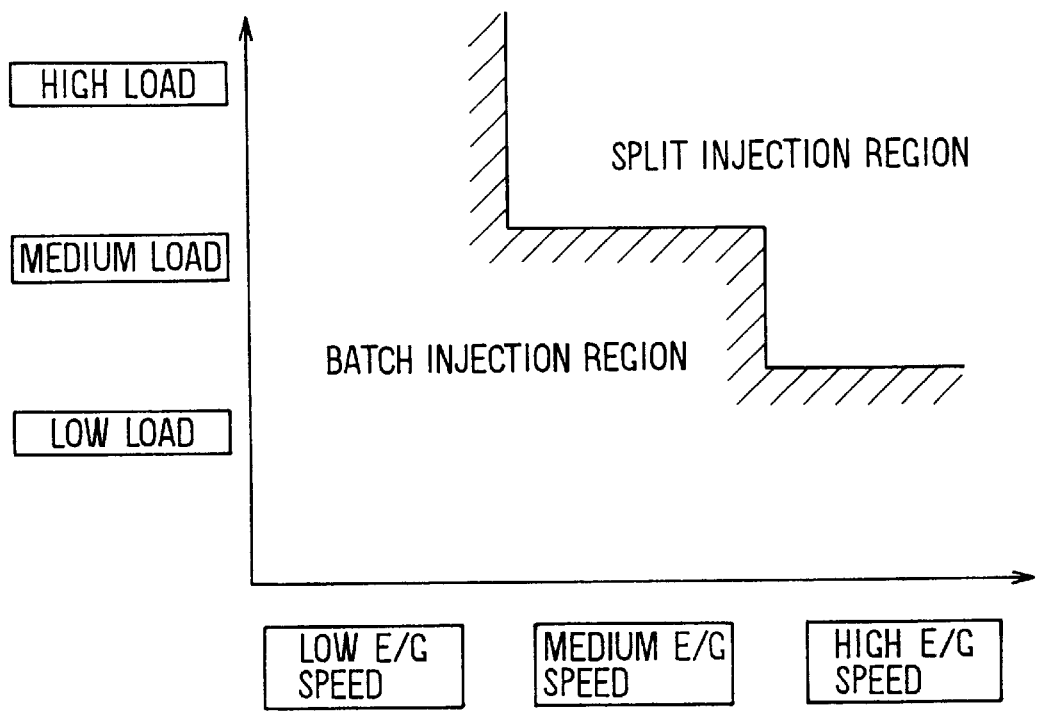
FIG. 18 is a graph showing regions of the batch injection and the split injection in a second embodiment of the present invention.

In FIG. 18, the "batch injection region" (as hatched) is set not only in the low/medium speed and low/medium region but also in the low speed and high load region and the high speed and low load region. Moreover, the remaining region is set to the "split injection region". In this case, the time period for the fuel to be injected in the batch injection mode is longer than that of the case using the map of FIG. 13. As result, the charging efficiency of the intake air is improved in a wider engine running state. However, which of the map of FIG. 13 or 18 is to be adopted is determined according to the engine specifications.

Figure 19:
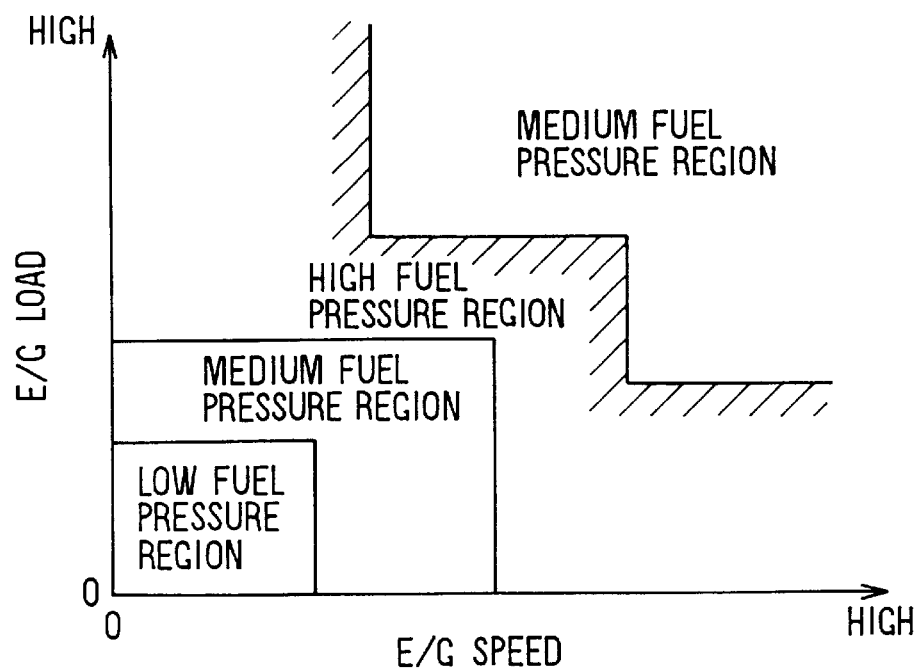
FIG. 19 is a graph showing regions of fuel pressure according to the engine states in the second embodiment.

The hatched region of FIG. 19 is identical to the batch injection region of the map of FIG. 18. In this region, the low fuel pressure region, the medium fuel pressure region and the high fuel pressure region are set according to the engine speed and the engine load. Here, the medium fuel pressure region is set in the region (other than the hatched region) corresponding to the split injection region of FIG. 19.

Third Embodiment

Figure 20:
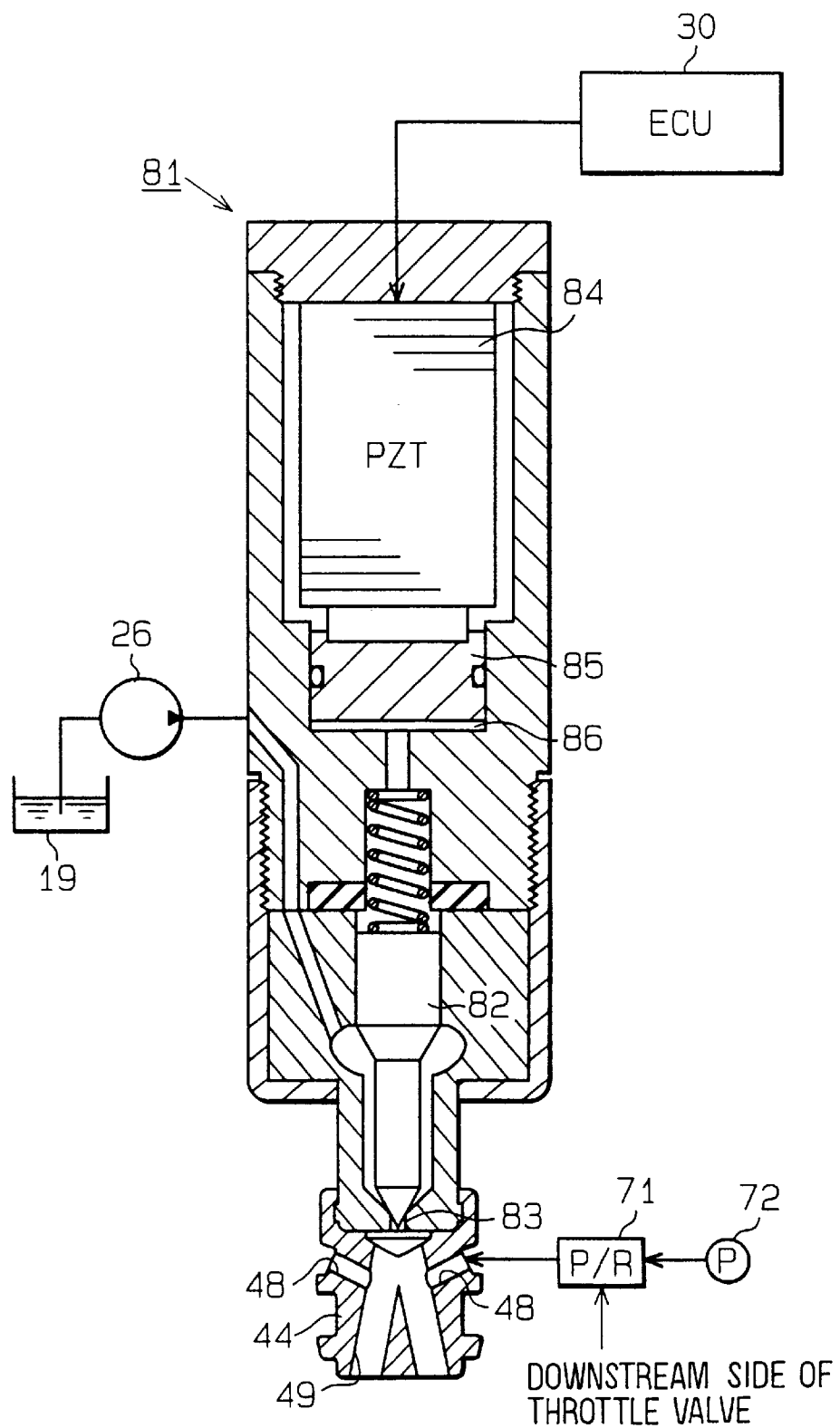
FIG. 20 is a sectional view showing a piezoelectric type injector used in a third embodiment.

In the foregoing embodiments, the injection flow rate per unit time of the injector 18 is changed by adjusting the fuel pressure Pf variably. This can be modified in the following. Specifically, the injection flow rate is changed by adjusting the lift amount of the valve member of the injector variably while holding the fuel pressure Pf at a constant level. As a result, the injection flow rate per unit time of the fuel to be injected from the injector is controlled to introduce the injected fuel of the injector at a specified timing (one third of the beginning of the suction stroke) in the suction stroke. In this case, there is used an injector 81 of the piezoelectric drive type of FIG. 20. The injector 81 comprises generally: a needle valve 82 biased normally in the direction to open (downward in the figure); an air-assisting adapter 44 (identical to that of FIG. 2) mounted in an injection port 83; a piezoelectric stack 84 having a multiplicity of PZT layers (of lead titanate/zirconate) stacked as a piezoelectric element; and a piston 85 to be moved according to the distorted deformation of the piezoelectric stack 84. At the fuel injection time by the injector 81, the piezoelectric stack 84 is deformed in the contracting direction in response to the voltage signal from the ECU 30 so that the piston 85 is retracted (upward in the figure). As a result, a vacuum is established in a pressure control chamber 86 so that the needle valve 82 moves upward to inject the fuel from the injection port 83. When the piezoelectric stack 84 is deformed backward (in the expanding direction) to move the piston 85 forward, the needle valve 82 moves forward so that the injection port 83 is closed to stop the fuel injection.

Figure 21:
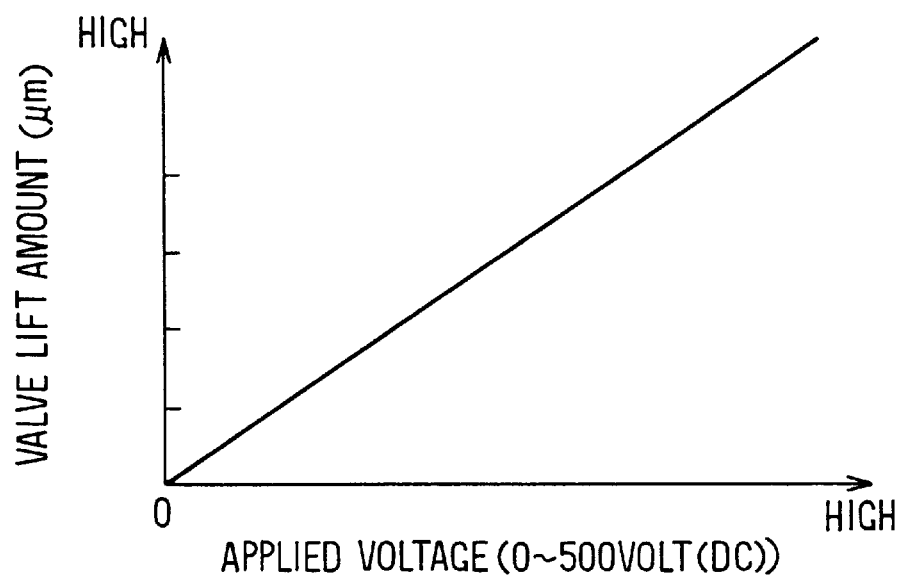
FIG. 21 is a graph showing a relation between a voltage applied to a piezo stack and a valve lift.
Figure 22:
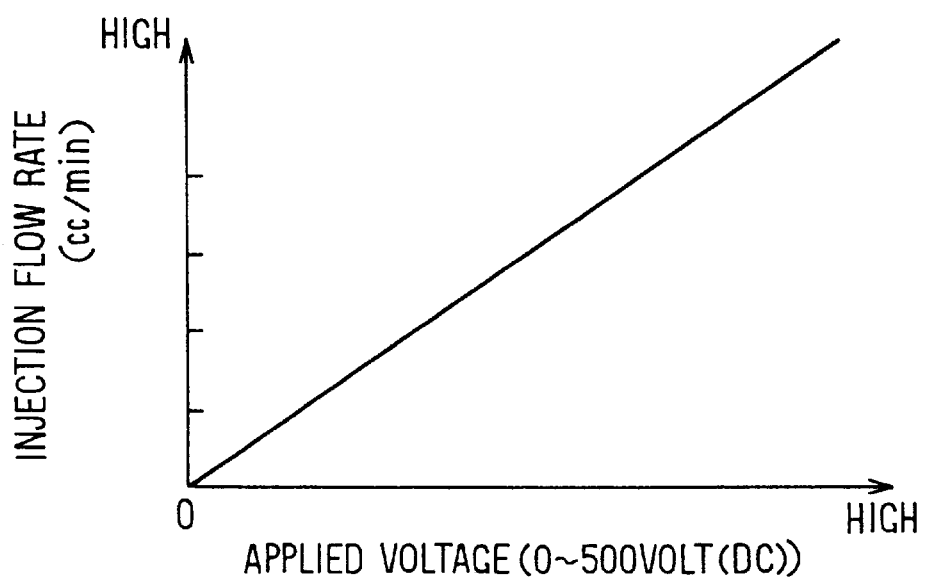
FIG. 22 is a graph showing the voltage applied to the piezo stack and injection flow rate.

By varying the applied voltage of the piezoelectric stack 84, the lift amount of the needle valve 82 can be arbitrarily set. In short, the area for the fuel to pass therethrough is made variable to vary the injection flow rate of the fuel without any change in the fuel pressure Pf. Specifically, the lift amount is usually controlled by applying a DC voltage of 0 to 500 (volts) to the piezoelectric stack 84. FIG. 21 illustrates a relation between the voltage applied to the piezoelectric stack 84 and the valve lift amount of the injector 81, and FIG. 22 illustrates a relation between the voltage applied to the piezoelectric stack 84 and the injection flow rate per unit time of the injector 81. The control of the injection flow rate by the piezoelectric stack 84 is executed by using the regions illustrated in FIGS. 14 and 19, for example, in accordance with the engine speed and the engine load (intake pressure PM) at a higher rate for the higher pressure regions of FIGS. 14 and 19.

However, it is not essential to adjust the fuel flow into the cylinder to the predetermined initial timing of the suction stroke (i.e., to adjust the flow-in timing of the fuel) and to inject the fuel dividedly in accordance with the engine running states (i.e., to inject the fuel dividedly), but the system may be embodied while omitting those requisite constructions.

Fourth Embodiment

Figure 23:
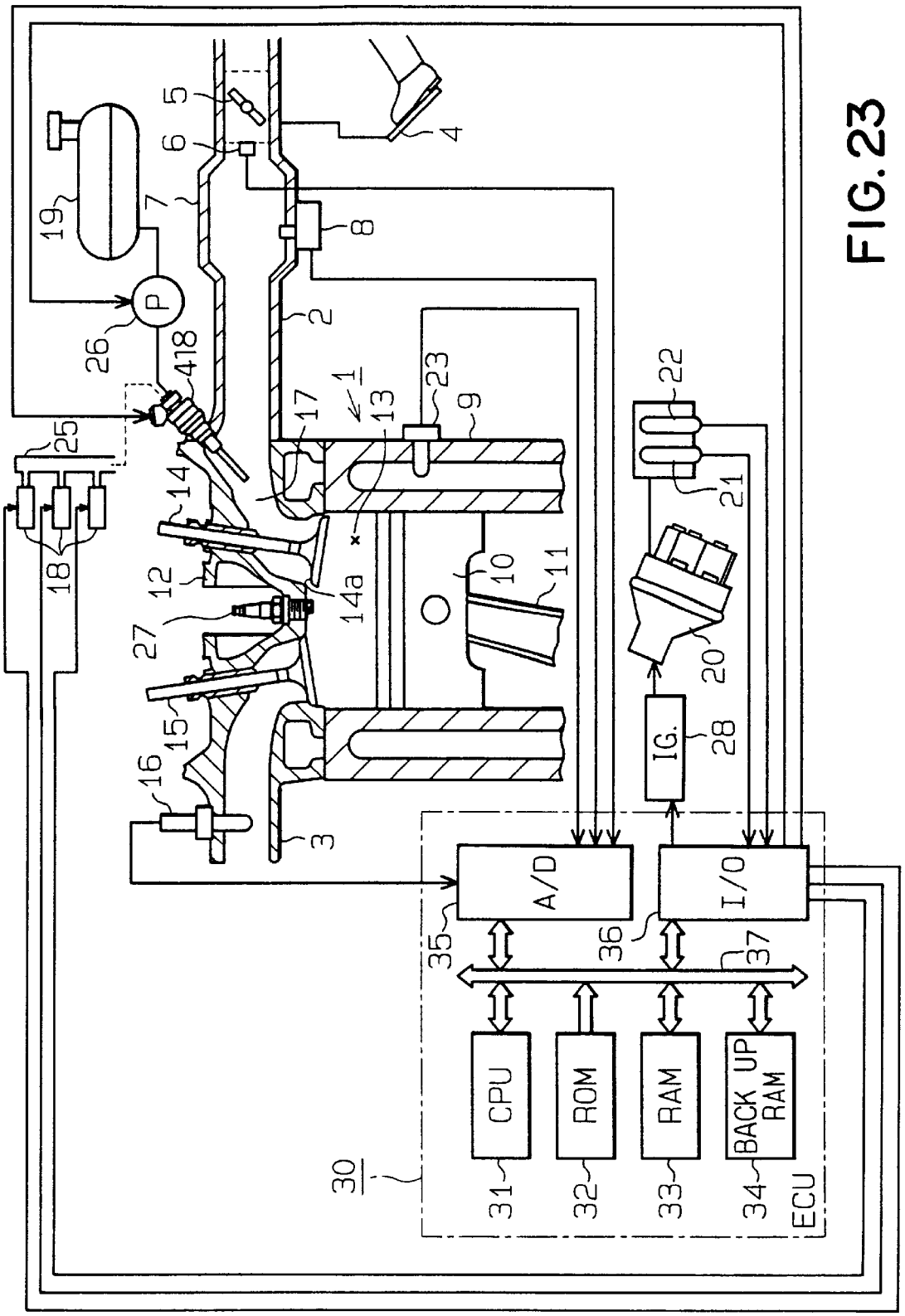
FIG. 23 is a schematic view showing a fuel injection system according to a fourth embodiment of the present invention.
Figure 24:
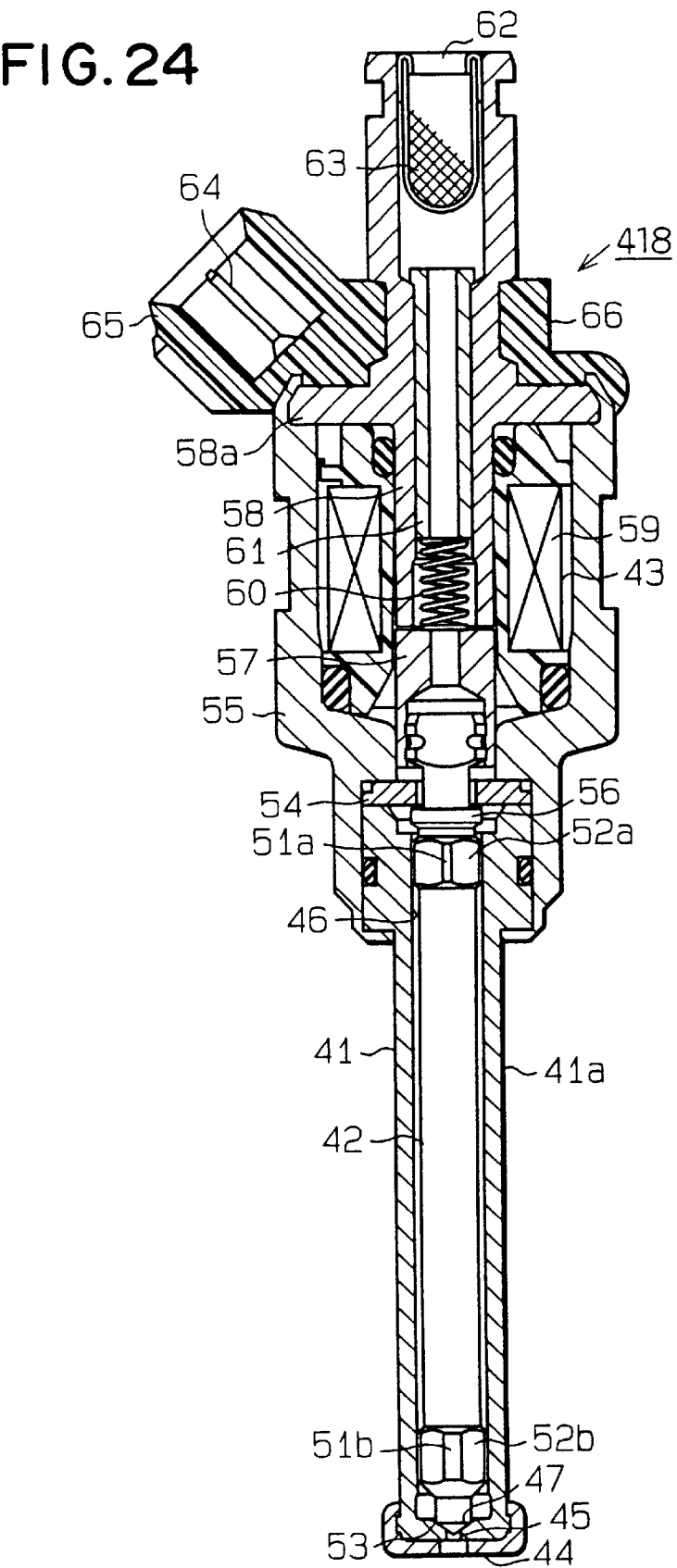
FIG. 24 is a sectional view of a fuel injector used in the fourth embodiment.

In this embodiment, as shown in FIG. 23, the fuel injection system is constructed similarly to the foregoing embodiments (e.g., FIG. 1). However, an injector 418 is constructed differently as shown in FIG. 24. The injector 418 is a normally closed electromagnetic type.

Figure 25:
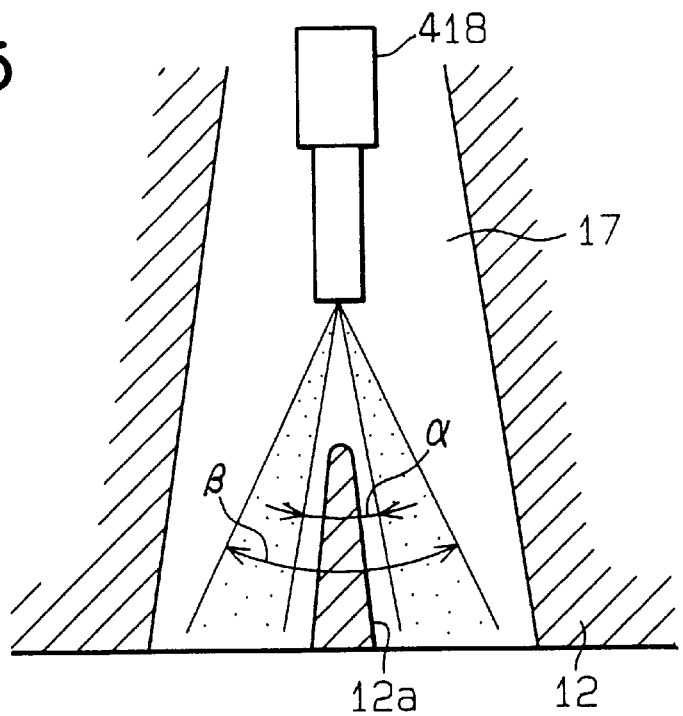
FIG. 25 is a sectional view showing a spray of fuel injected from the fuel injector in an intake port.

The valve body 41 has at its cylindrical part 41a a larger length than that shown in FIG. 2. On the leading end of the valve body 41, moreover, there is mounted the plate-type air-assisting adapter 44 which has multiple-hole injection port. This plate-type air-assisting adapter 44 is bifurcated in two directions toward the center of the faces 14a of the two intake valves 14 of each cylinder and has totally twenty injection ports, for example. As shown in FIG. 25, more specifically, the injector 418 is constructed as a 2-jet type injector for injecting the fuel in two directions from its leading end.

In the injector 418, the fuel having flown from the inlet port 62 is introduced into the bore 46 through the filter 63, the cylindrical member 61, the core 57 and through the clearance between the stopper 54 and the valve member 42. When the solenoid coil 59 is activated by the ECU 30, a magnetic force is generated to pull the core 57 upward against the biasing force of the return spring 60. As a result, the clearance between the valve seat 47 and the abutment part 53 is opened so that the fuel is injected through the injection port 45 and the plate-type air-assisting adapter 44 into the intake port 17.

The fuel injection control system is designed to:

(A) execute the "suction stroke synchronized injection" by the injector 418;

(B) reduce the particle size of the fuel by forming multiple holes in the injection port;

(C) extend the leading end of the injector 418 to bring the injection port forward to the central part of the intake port 17; and (D) regulate the spray angle of the injector 418 to a predetermined value.

According to (A), suction stroke synchronized injection, more specifically, for a predetermined time period for the engine 1 to shift from the exhaust stroke to the suction stroke, the fuel is injected into the intake port 17 so that the injected fuel flows into the combustion chamber 13 as the intake valve 14 opens in the suction stroke. In this case, the intake air is cooled with the fuel evaporation when the mixture flows into the combustion chamber 13, to improve the charging efficiency of the intake air by the evaporation cooling effect.

With regard to (B), in order that the combustion efficiency of the engine 1 may be enhanced to extract a high torque and to suppress the emission at a low level, it is sufficient to homogenize the mixture prepared in the combustion chamber 13, as much as possible. According to one method, the multiple holes are formed in the injection port to atomize the fuel spray. Without the air assistance and under the ordinary fuel pressure (=about 300 to 500 kPa), more specifically, the fuel is atomized to have a gas particle diameter (i.e., the Sauter's mean diameter) of about 50 microns.

With regard to (C), it is thought that the port central part ordinarily has a higher air flow velocity than that in the vicinity of the wall face. This distribution of the flow velocity in the intake port 17 has been confirmed by our simulation experiments using the Schlieren visualizing tests for the observations of the air flow.

Figure 26:
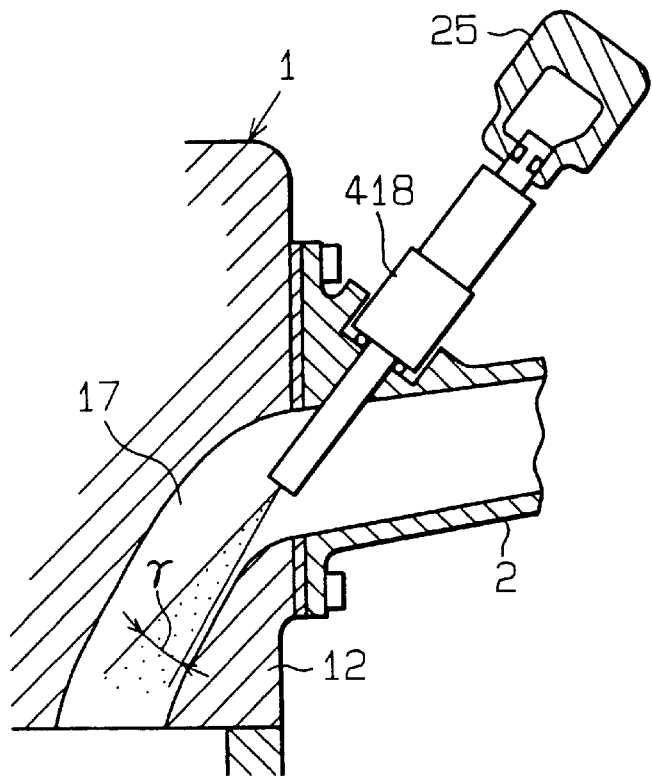
FIG. 26 is a sectional view showing a spray of fuel injected from the fuel injector in the intake port.

In this embodiment, therefore, the valve body 41 of the injector 418 is extended (as shown in FIG. 24) so that the injector 418 may be extended (protruded) forward to have its leading end (injection port) positioned at the central part of the intake port 17 as shown in FIG. 26. Here, the injector 418 is arranged toward the face 14a of the intake valve 14. In this case, the fuel injected by the injector 418 is entrained by the main flow (i.e., air flow zone having a high flow velocity) of the intake air flowing in the intake port 17. This injected fuel does not stagnate in the intake port 17 but flows together with the intake air into the combustion chamber 13 as the intake valve 14 opens.

Figure 27:
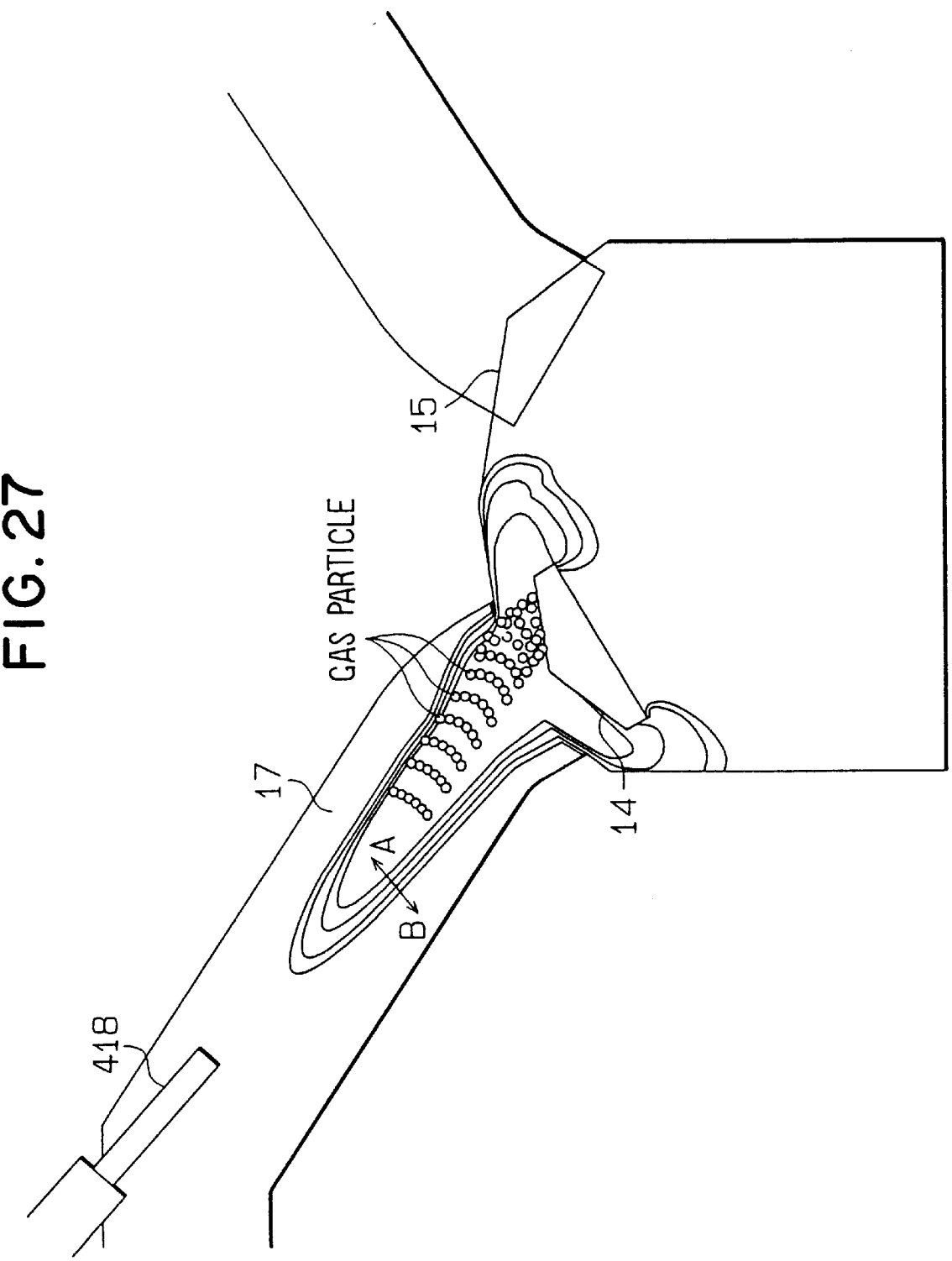
FIG. 27 is a schematic view showing a simulation of fuel spray.

FIG. 27 shows one example of the investigations of the simulations of the fuel spray at the intake port 17. The individual zones across "A<=>B", as shown, indicate the zones where the fuel concentrations are so different that it is richer at the side A (located at the port central part) whereas leaner at the side B (located at the outer side of the port). Since the injector 418 is extended forward toward the port central part, more specifically, the fuel is fed more to the central part of the intake port 17 having a higher air flow velocity so that it flows into the cylinder as the intake valve 14 opens. Here, it is found that the fuel is not substantially present in the vicinity of the wall face of the intake port having a lower intake flow velocity.

With regard to (D), the injector 418 is arranged in the state where it is extended forward to the central part of the intake port 17. As shown in FIG. 26, the injector 418 has its spray angle γ set within a range of γ=8 to 15 degrees (°). Of these, the angle γ=8 degrees corresponds to the lower limit of the spray angle for preventing the atomized fuel from again growing fat, and the angle γ=15 degrees corresponds to the upper limit of the spray angle for preventing the port wetting.

In FIG. 25, on the other hand, the spray angles α and β for determining the spray characteristics of the 2-jet injector are set within the ranges of the angle α=18 to 22 degrees and the angle β=46 to 51 degrees. These angles α and β are restricted by a partitioning wall 12a of the cylinder head 12 for separating the two intake valves 14, and the partition 12a is retracted as much as possible at this time. As a result, it is possible to eliminate the causes which might otherwise obstruct the forward protrusion of the injection port to the port central part.

The specific conditions in the actual system such as the individual values of the spray angles α, β and γ and the mounting position (extended position) of the injector 418 are determined mainly from the simulation calculations and on the basis of the visualizing investigations. For example, the spray angle of the fuel by the injector 418 may be set according to the diameter of the face 14a of the intake valve 14. Here in this embodiment, the valve face 14a has a diameter of 29 mm, and the spray angle is set to effect the fuel injection toward the face 14a.

In the fuel injection control system thus constructed, upon the fuel injection by the injector 418, the fuel is injected into the intake port 17 toward the face of the intake valve 14 so that the fuel spray is entrained by the main flow part (having the higher flow velocity) of the intake port 17. At this time, most of the fuel flows as it is through the valve clearance of the opened valve into the combustion chamber 13 whereas the remaining part of the fuel is entrained by the air flow to impinge against the valve face 14a or the like so that it is pulverized and atomized to flow into the combustion chamber 13. Because no fuel is present in the vicinity of the port wall face where the flow velocity is relatively low, so that the port wetting is less than that of the existing system of the prior art. Owing to this reduced port wetting, the torque is increased.

In this case, the spray angle γ of the fuel can be enlarged in the state having no port wetting. As a result, the fuel particles can be prevented from growing again fat, as might otherwise be caused by the interference between the stream lines of the fuel spray.

Figure 28:
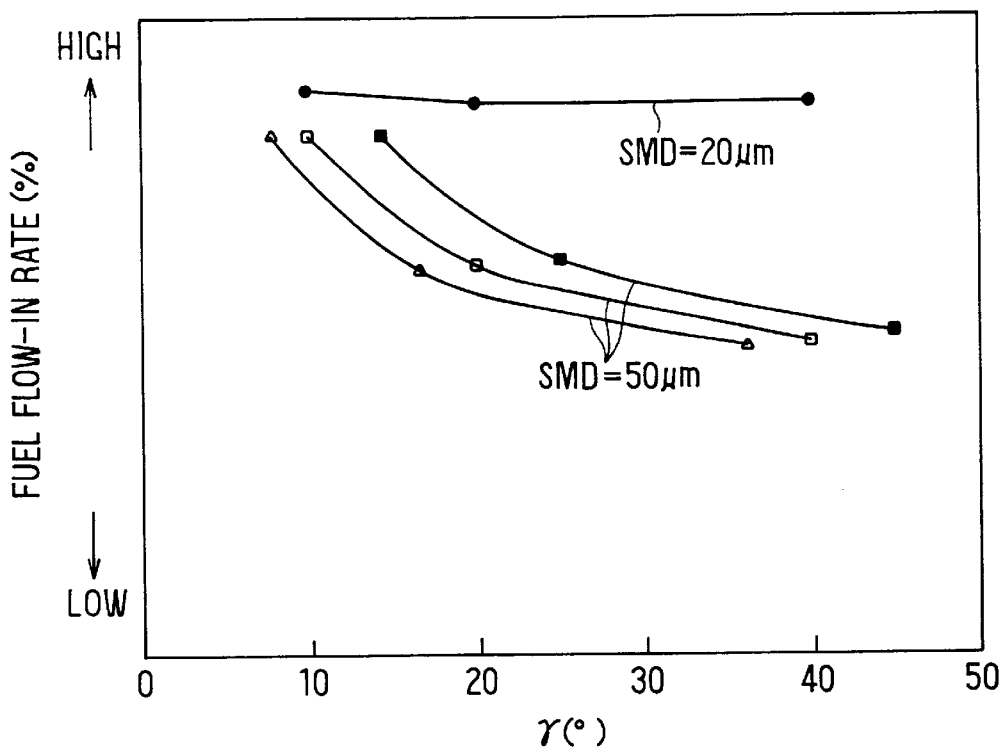
FIG. 28 is a graph showing a relation between a fuel spray angle and fuel flow-in rate.

FIG. 28 plots the experimental results of relations between the spray angle γ and the inflow percentage (%) into the cylinder, individually, for SMD=20 microns and 50 microns. The three data for SMD=50 microns appearing in FIG. 28 indicate the individual experimental results due to the differences in the extruded position of the injector. It is seen that a high fuel inflow percentage can be achieved for the fuel spray of the gas particle diameter of SMD=50 microns by setting the spray angle γ to 8 to 15 degrees. In the case of SMD=20 microns, however, a high fuel inflow percentage can be maintained even if the spray angle γ is varied within a range of 10 to 40 degrees, for example.

Figure 29:
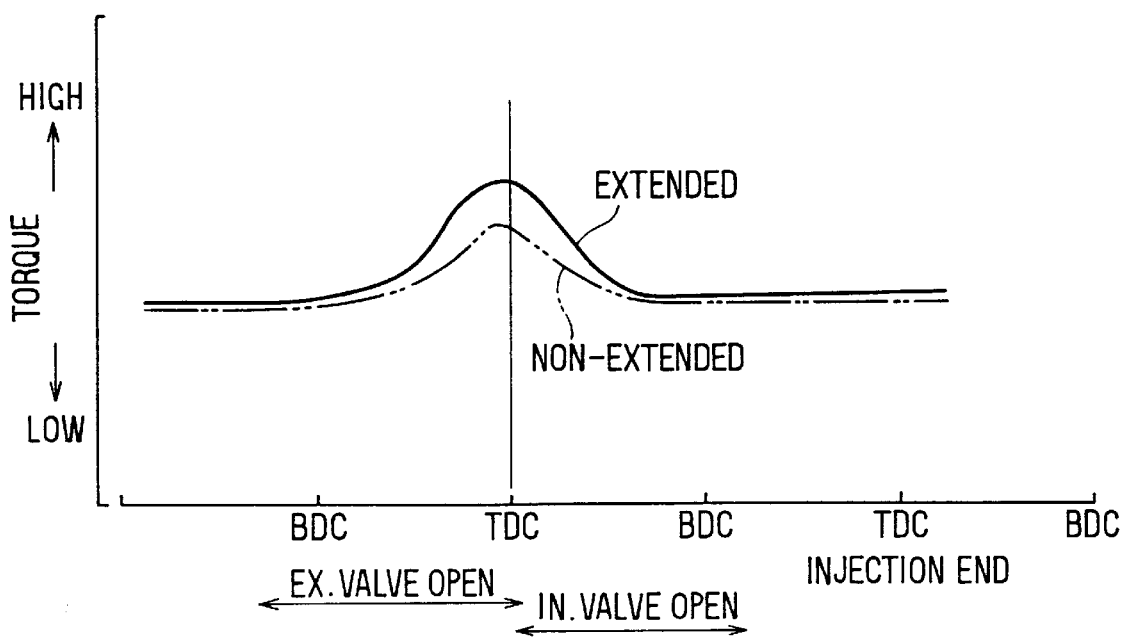
FIG. 29 is a graph showing a relation between an extension of the injector and engine output torque.

FIG. 29 plots the experimental results comparing the increase in the torque due to the fuel evaporation cooling effect in the suction stroke synchronized injection between the system having the extended injector 418 and the system having the conventional unextended injector. It is seen from FIG. 29 that the torque is raised more in the system having the protrusion. This means that the fuel injected by the injector 418 sufficiently flows into the cylinder.

Figure 30:
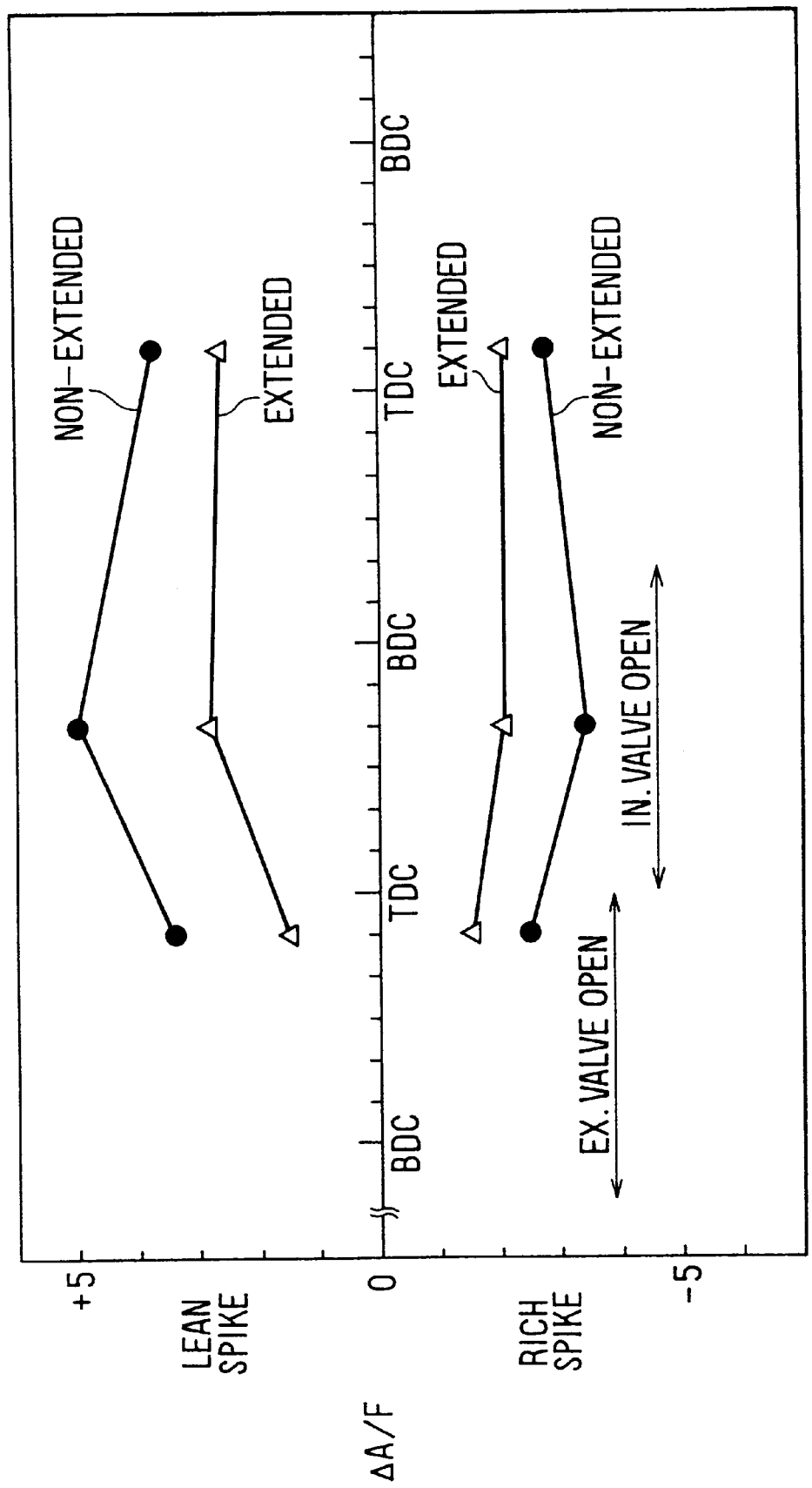
FIG. 30 is a graph showing a relation between an extension of the injector and air-fuel ratio deviation.
Figure 31A:
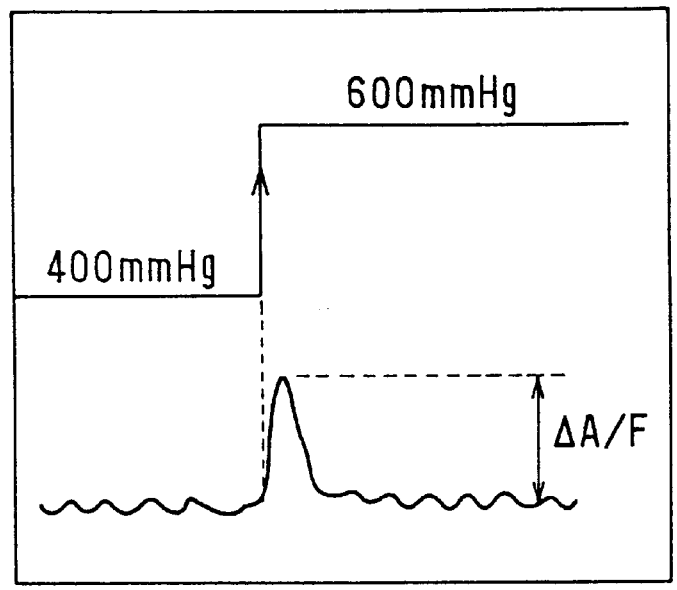
FIGS. 31A and 31B are time charts showing a lean spike and a rich spike in air-fuel ratio at engine transient operation, respectively.
Figure 31B:
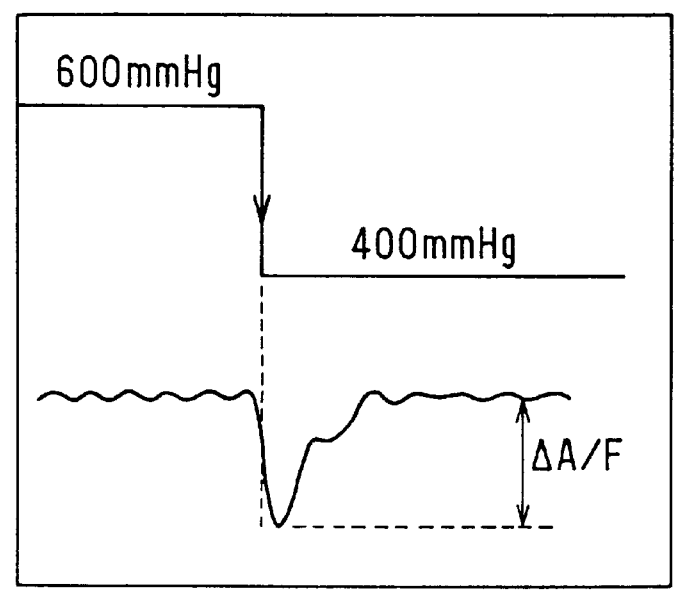

When the port wetting is reduced, the air-fuel ratio spike at the engine transition time is drastically improved. This effect has been confirmed in the actual system, as will be described with reference to FIG. 30. The experimental results, as plotted in FIG. 30, are obtained by raising or lowering the intake pipe pressure under the condition without the low temperature correction from the states of Ne=2,000 rpm, Tw=20° C. and the air-fuel ratio=stoichiometric, to cause the lean spike or rich spike of the air-fuel ratio. Here in these experiments, the intake pipe pressure is stepwisely raised from 400 mmHg to 600 mmHg, as illustrated in FIG. 31A, for the lean spike time of the air-fuel ratio. For the rich spike time of the air-fuel ratio, on the other hand, the intake pipe pressure is stepwisely lowered from 600 mmHG to 400 mmHG, as illustrated in FIG. 31B.

The ordinate of FIG. 30 plots the air-fuel ratio deviation ΔA/F (e.g., the lean peak or the rich peak) to the lean side or the rich side at the lean or rich spike time for the system (symbol Δ) having the extended injection port and for the other system (symbol ●). The abscissa of FIG. 30 indicates the crank angle of the engine 1. In FIG. 30, the values ΔA/F are plotted individually at the crank angles by setting the injection ending timings estimating the time period till the fuel flow into the cylinder, to 30 degrees CA before the intake TDC, 120 degrees CA (i.e., the center of the intake valve opening) after the intake TDC and 30 degrees CA after the compression TDC.

It is seen from FIG. 30 that the air-fuel ratio deviation ΔA/F (peak value) of the extended injector system is smaller than that of the not-extended injector system for each of the lean and rich spike times so that an effect of the wetting amount reduction is achieved. Here, it has been confirmed that the lean and rich peaks of the air-fuel ratio are reduced by optimizing the spray angle.

Moreover, it has been found that the air-fuel ratio deviation ΔA/F is the minimum when the injection end is timed before the intake valve opening (as plotted at the most lefthand side of FIG. 30) so that the fuel may flow into the cylinder at the initial stage of the suction stroke. This is considered to result from the fact that the fuel is so entrained by the relatively fast air flow just after the intake valve opening by engine the injection just before the valve opening that it is less likely to wet the port wall face. As a result, the deterioration of the emission due to the air-fuel ratio deviation at the transition time is suppressed. This phenomenon has been confirmed from the fact that a similar result is obtained when the cooling water temperature Tw is as high as 80° C.

It is to be noted that the injector 418 may be driven in the similar manner as in the foregoing embodiments.

Fifth Embodiment

Figure 32A:
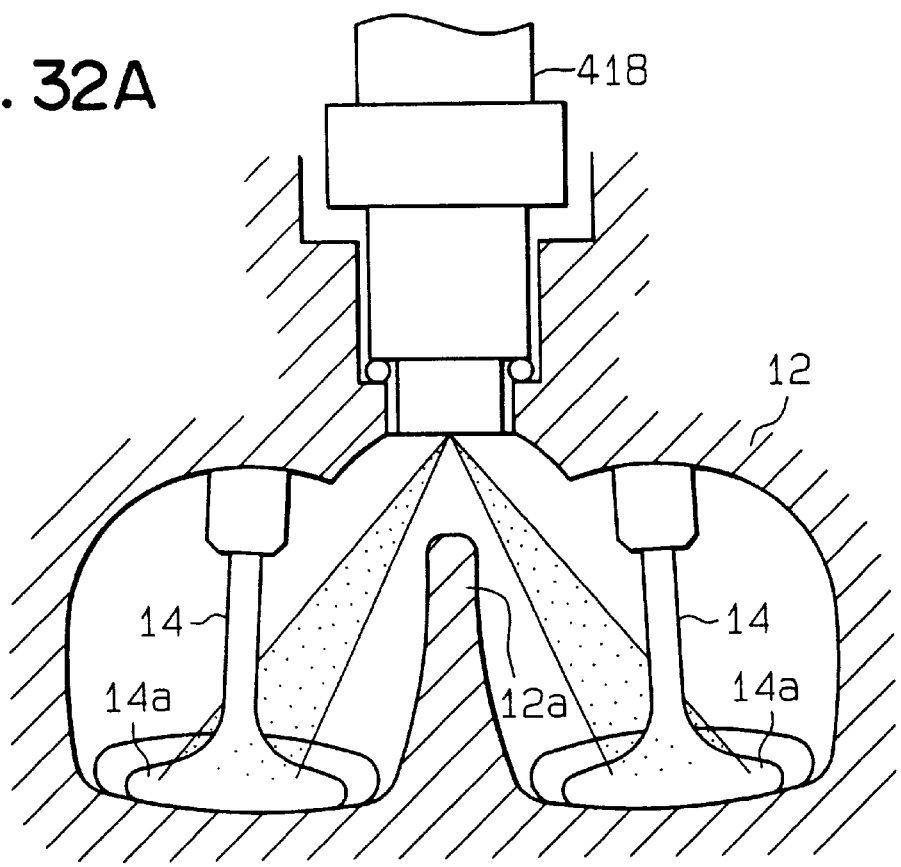
FIGS. 32A and 32B are sectional views showing sprays of fuel injected from fuel injectors in a fifth embodiment of the present invention, respectively.
Figure 32B:
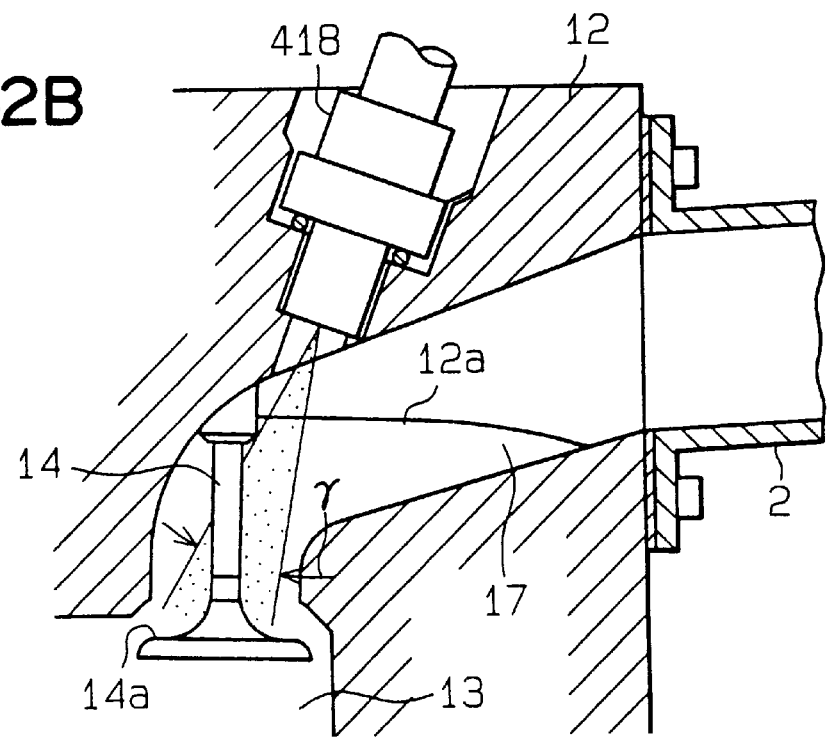

In this embodiment, as shown in FIGS. 32A and 32B, the injector 418 is mounted directly in the cylinder head 12 while being directed toward the face of the intake valve 14. Since the injector 418 is mounted in the cylinder head 12, moreover, its injection port is brought closer to the intake valve 14. Here, the partition wall 12a of the cylinder head 12 is extended upward from the face of the intake valve 14 to keep the fuel spray from interfering with the partition wall face.

The injector 418 injects the fuel from the position, as distant by about 40 to 50 mm from the face 14a of the intake valve 14, so that the fuel may be entrained by the air flow while aiming at the face 14a. Most of the fuel is entrained from the clearance of the intake valve 14 into the combustion chamber 13 by the air flow, whereas the remaining fuel impinges upon the valve surface at a high temperature so that it is atomized to flow into the combustion chamber 13.

In this case, the spray angle γ of the fuel can be set to a relatively large value by bringing the injection port close to the valve face 14a. This is highly effective for preventing the atomized fuel from again growing fat and for reducing the port wetting with the fuel spray. The spray angle γ is so optimized within a range of 20 to 30 degrees as to ensure the effects for restricting the fuel from again growing fat and for reducing the wetting amount. The angle γ=20 degrees is the lower limit for realizing the homogenization of the fuel spray, and the angle γ=30 degrees is the upper limit for avoiding the port wetting.

The embodiment is exemplified by the 2-jet type injector for injecting the fuel simultaneously to the two intake valves 14. However, the invention may be exemplified by a 1-jet type or 3-jet type injector.

In the embodiment, the suction stroke synchronized injection has been put into practice. Alternatively, however, the invention may be exemplified by the "suction stroke asynchronized injection" in which the fuel is injected when the intake valve 14 is closed. The fuel is scattered and atomized at the impingement upon the face of the intake valve 14 by injecting it at a spray angle aiming at the valve face. This atomization reduces the wall face wetting (or the port wetting) with the fuel drastically.

In the foregoing fourth embodiment, the spray angle γ of the injector 18 is regulated within the range of 8 to 15 degrees, which may be changed. When the restriction of the atomized fuel from again growing fat is desired, for example, the spray angle γ is limited to about 12 to 15 degrees, for example, within the above-specified angular range. When the avoidance of the port wetting is desired, on the other hand, the spray angle γ is limited to about 8 to 10 degrees, for example, within the same angular range. However, the range of the angle γ=8 to 15 degrees takes the general numerical values which are deduced by experiments so that it may be accordingly shifted to the wider side, for example, if the distance between the injection port and the face of the intake valve.

In the fifth embodiment, on the other hand, the spray angle γ of the injector 18 is regulated within the range of 20 to 30 degrees, which may also be changed. For example, the lower limit of the spray angle γ is lowered. The lower limit of the angle γ may be changed to 8 degrees because the atomized fuel can be prevented from again growing fat even at about 8 degrees.

The present invention should not be limited to the foregoing embodiments, but may be modified in many ways without departing from the spirit of the invention.

We claim:

1. A fuel injection system for an engine having an intake valve between an intake port and a cylinder, comprising:
   means for injecting fuel into the intake port toward a face of the intake valve;
   means for atomizing the injected fuel when driven by a part of output of the engine;
   means for estimating temperature of the face of the intake valve; and
   means for adjusting the fuel atomizing means variably in accordance with the estimated face temperature, the adjusting means enabling and disabling atomizing operation of the fuel atomizing means when the estimated face temperature is below and above a reference temperature.

2. A fuel injection system as in claim 1, wherein the fuel injecting means has multiple holes in an injection port thereof to atomize the injected fuel into a predetermined particle size.

3. A fuel injection system as in claim 2, wherein:
   the injection port is located at a central part of the intake port; and
   a spray angle of the injected fuel is determined based on a diameter of the face of the intake valve.

4. A fuel injection system as in claim 3, wherein the spray angle is between 8° and 15°.

5. A fuel injection system as in claim 3, wherein:
   the fuel injecting means is constructed to inject fuel, at the same time, toward two intake valves provided for the cylinder of the engine; and
   the injection port is located above a partition wall of a head of the cylinder, the partition wall extending above the face of the two intake valves and separating the intake port into two passages for the two intake valves.

6. A fuel injection system as in claim 3, wherein:

the injection port is located close to the face of the intake valve; and the spray angle is between 20° and 30°.

7. A fuel injection system as in claim 1, wherein the adjusting means adjusts the fuel atomizing means to reduce gradually atomization of the injected fuel as the estimated face temperature rises.

8. A fuel injection system as in claim 1, wherein:

the temperature estimating means estimates the face temperature based on an engine operating state; and the adjusting means disables the atomizing operation of the atomizing means at at least one of a high rotation speed state and high load state of the engine.

9. A fuel injection system as in claim 1, wherein:

the fuel atomizing means includes an air pump driven by the part of the output of the engine for supplying pressurized air to an injection port of the injecting means; and the adjusting means enables and disables operation of the air pump when the estimated face temperature is below and above the reference temperature.

10. A fuel injection system as in claim 1, further comprising:

means for driving the fuel injecting means so that the injected fuel flows into the cylinder within a predetermined initial period of opening of the intake valve.

11. A fuel injection system for an engine having an intake valve between an intake port and a cylinder, comprising:

a fuel injector having multiple holes in an injection port thereof for injecting fuel into the intake port toward a face of the intake valve;

wherein the fuel injector is located at a central part of the intake port, and the injector has a spray angle of the injected fuel determined based on a diameter of the face of the intake valve.

12. A fuel injection system for an engine having an intake valve between an intake port and a cylinder, comprising:

a fuel injector having multiple holes in an injection port thereof for injecting fuel into the intake port toward a face of the intake valve;

wherein the fuel injector is located at a central part of the intake port, and the injector has a spray angle of the injected fuel between 8° and 15°.

13. A fuel injection system as in claim 12, wherein:

the fuel injecting means is constructed to inject fuel, at the same time, toward two intake valves provided for the cylinder of the engine; and the injection port is located above a partition wall of a head of the cylinder, the partition wall extending above the face of the two intake valves and separating the intake port into two passages for the two intake valves.

14. A fuel injection system for an engine having an intake valve between an intake port and a cylinder, comprising:

a fuel injector having multiple holes in an injection port thereof for injecting fuel into the intake port toward a face of the intake valve;

wherein the fuel injector is located at a position close to the face of the intake valve.

15. A fuel injection system as in claim 14, wherein a spray angle of the injected fuel is between 20° and 30°.

* * * * *